United States Patent
Yu et al.

(10) Patent No.: US 11,321,654 B2
(45) Date of Patent: May 3, 2022

(54) SKEW-MITIGATED EVOLVING PREDICTION MODEL

(71) Applicant: INTERNATIONAL BUSINESS MACHINES CORPORATION, Armonk, NY (US)

(72) Inventors: Zhiyang Yu, Plano, TX (US); Craig M. Trim, Ventura, CA (US); Stefan A. G. van Der Stockt, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 49 days.

(21) Appl. No.: 16/864,009

(22) Filed: Apr. 30, 2020

(65) Prior Publication Data

US 2021/0342757 A1 Nov. 4, 2021

(51) Int. Cl.
*G06Q 10/06* (2012.01)
*G06Q 30/02* (2012.01)
*G06N 20/20* (2019.01)
*G06N 7/00* (2006.01)
*G06Q 40/08* (2012.01)

(52) U.S. Cl.
CPC ......... *G06Q 10/0635* (2013.01); *G06N 7/005* (2013.01); *G06N 20/20* (2019.01); *G06Q 40/08* (2013.01)

(58) Field of Classification Search
CPC .............................. G06Q 10/06; G06Q 30/02
USPC ...................................................... 705/7.28
See application file for complete search history.

(56) References Cited

U.S. PATENT DOCUMENTS

| | | | |
|---|---|---|---|
| 2007/0185867 A1* | 8/2007 | Maga | G06F 16/24 |
| 2009/0177536 A1 | 7/2009 | Alexander et al. | |
| 2015/0186817 A1* | 7/2015 | Kim | G06Q 10/0635 |
| | | | 705/7.28 |
| 2019/0122270 A1 | 4/2019 | Suslik et al. | |
| 2019/0333155 A1* | 10/2019 | Natesan Ramamurthy | |
| | | | G06Q 40/08 |
| 2019/0361146 A1* | 11/2019 | Roth | G01V 99/005 |
| 2020/0034873 A1* | 1/2020 | Poynter | G06Q 30/0249 |

(Continued)

FOREIGN PATENT DOCUMENTS

KR 1020180117286 A 10/2018
KR 1020190101327 A 8/2019

OTHER PUBLICATIONS

Mell, et al. "*The NIST Definition of Cloud Computing*", NIST Special Publication 800-145, Sep. 2011, Gaithersburg, MD, 7 pgs.

*Primary Examiner* — Nga B Nguyen
(74) *Attorney, Agent, or Firm* — Stephanie Carusillo; George S. Blasiak; Heslin Rothenberg Farley & Mesiti PC

(57) ABSTRACT

Methods, computer program products, and systems are presented for service cost prediction using machine learning. A claims risk model is formed for predicting a per member per month cost based on variables trained in early prediction models and variables of claim record data from data sources. A training dataset for the claims risk model is modified based on a preconfigured cap value and two distinctive datasets are generated, which trains the claims risk model into a capped submodel and an outlier submodel, respectively. Each submodel makes prediction of the per member per month cost and a slice model interpolates a cost predicted by the capped submodel and another predicted by the outlier submodel. The splice model redistributes the outcomes of the capped submodel and the outlier submodel.

20 Claims, 10 Drawing Sheets

(56) References Cited

U.S. PATENT DOCUMENTS

2021/0049460 A1\* 2/2021 Ahn ................. G06N 7/005
2021/0264449 A1\* 8/2021 Tsai ................. G06Q 30/0202

\* cited by examiner

SKEW-MITIGATED EVOLVING PREDICTION MODEL

TECHNICAL FIELD

The present disclosure relates to prediction by machine learning models, and more particularly to methods, computer program products, and systems for service cost prediction using machine learning.

BACKGROUND

Conventionally, entities offering a service for a fee determine some fixed levels of fees for all subscribers based on an overall cost to provide the service to all subscribers and obtain a desired profit margin. Depending on the characteristics of the service, costs to provide the agreed service to each individual subscriber vary greatly from subscriber to subscriber. The amount of data and the type of information that can be used to make plans on the service cost in the future increases and diversifies significantly over time while the service is being subscribed.

SUMMARY

The shortcomings of the prior art are overcome, and additional advantages are provided, through the provision, in one aspect, of a method. The method includes, for instance: forming, by one or more processors, a claims risk model for predicting a per member per month cost based on variables trained in early prediction models and variables of claim record data from data sources; generating, by the one or more processors, a first dataset for a capped submodel and a second dataset for an outlier submodel by modifying a training dataset for the claims risk model based on a preconfigured cap value; training, by the one or more processors, the claims risk model with the first dataset for the capped submodel, resulting in the capped submodel; training, by the one or more processors, the claims risk model with the second dataset for the outlier submodel, resulting in the outlier submodel; producing, by the one or more processors, a first cost predicted by the capped submodel and a second cost predicted by the outlier submodel; interpolating, by the one or more processors, the first cost predicted by the capped submodel and the second cost predicted by the outlier submodel from the producing by use of a splice model including a plurality of splice variables that fit datapoints in the training dataset at a predetermined number of splice points between the first cost and the second cost; and predicting, by the one or more processors, the per member per month cost for a member by running an individual dataset for the member on the capped submodel and the outlier submodel, and then running the splice model that redistributes the outcomes of the capped submodel and the outlier submodel.

Additional features are realized through the techniques set forth herein. Other embodiments and aspects, including but not limited to computer program products and systems, are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1:
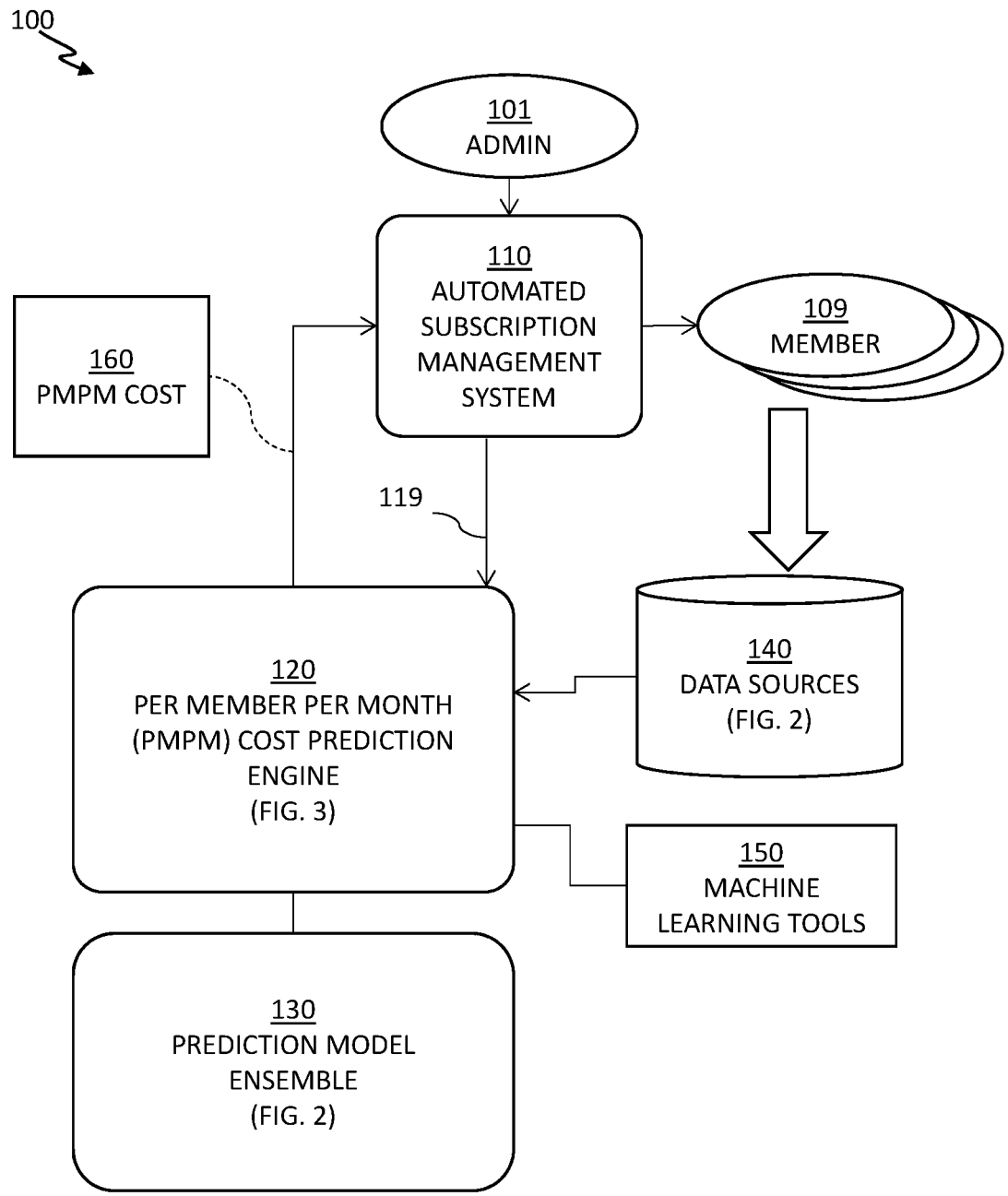
FIG. 1 depicts a system for subscription cost prediction by machine learning, in accordance with one or more embodiments set forth herein.

FIG. 1 depicts a system 100 for service cost prediction by machine learning, in accordance with one or more embodiments set forth herein.

The system 100 includes an automated subscription management system 110 and a Per Member Per Month (PMPM) cost prediction engine 120. The automated subscription management system 110 manages subscription of a service for which a plurality of members 109 had signed up by computerized billing. The PMPM cost prediction engine 120 produces a prediction model ensemble 130 that is utilized to predict a PMPM cost 160. The PMPM cost prediction engine 120 forwards the PMPM cost 160 to the automated subscription management system 110, which determines "per member" service fees based on the PMPM cost 160. The PMPM cost prediction engine 120 is operatively coupled with data sources 140 and one or more machine learning tools 150.

An administrator, which is referred to as an admin 101 in this specification, supervises and configures operations of the automated subscription management system 110 when necessary. The automated subscription management system 110 sends a request 119 for the PMPM cost 160 to the PMPM cost prediction engine 120, automatically according to a preconfigured schedule, or manually as input from the admin 101. Due to the number of the members 109 often in a range of several million and the respective service fees based on the PMPM cost 160, the automated subscription management system 110 operates mostly automatically in order for monthly invoicing to the members 109 according to the preconfigured schedule.

The PMPM cost 160 is defined as a cost of service incurred by an entity in providing the subscribed service to an individual of the members 109 for a period of one month. In this specification, the PMPM cost 160 can also indicate a cumulated service cost for twelve months of next year as a unit, without being referred to as an annual or yearly PMPM cost or a PMPM cost for a year. The PMPM cost 160 is a basis to determine a service fee for the members 109. Embodiments of the present invention concerns primarily technical aspects of predictive modeling in producing the PMPM cost 160.

In this specification, "per member" in the context of the system 100 indicates a cohort of certain members amongst the members 109, rather than an individual member, that demonstrates a distinctive pattern that influences the service cost in data contributed to the data sources 140 such that members in the same cohort would incur similar service costs and would be charged with the same amount and/or ratio of service fee based on the service costs. In this specification, term "cohort" indicates a group amongst the members 109 that have a common characteristic with respect to the usage of the service for which the PMPM cost 160 is predicted. Examples of common characteristics determining cohorts amongst the members 109 would depend on demographic, socio-economic, behavioral, and any other characteristics that affect the cost of the service. For example, for health insurance services, a cohort of the members 109 can be determined based on age, gender, smoking status, body mass index, or any other health indicators that can influence the amount of healthcare cost. In another example, for content streaming services, a cohort of the members 109 can be determined based on age, gender, geographical area, types of preferred and/or frequently watched content, or any other attributes that can influence the cost of providing such content. Particularly with respect to modeling, training, and testing of component models of the prediction model ensemble 130, it is because a great number of data sets should be analyzed to systematically extract information, which is then utilized to produce robust models, as often referred to as "big data" in areas of data science and analytics. For a request to predict the PMPM cost 160 for an individual member, if necessary, the PMPM cost prediction engine 120 returns the PMPM cost 160 for a cohort with which the individual member belongs.

The accuracy in predicting a cost of service in the future, as represented by the PMPM cost 160, is critical in profitability of the entity providing the subscribed service. The PMPM cost 160 is also difficult to predict in services where a small number of extreme values in the service cost significantly skews any prediction model based on the average, that is, the mean value.

For example, a healthcare insurance is a type of service in which a very small number of extreme cases can cost a lot more than an average service cost to provide and can skew the average service cost greatly, and accordingly, it is very hard to predict the cost of service for all members 109 with conventional prediction methods using averages. Conventionally, service costs for healthcare insurances are predicted as an average cost for the entire service population enrolled for the insurance, or based on an average service cost per capita as incurred by all health insurance companies in a country or a region, expecting that a cumulative sum of losses and profits for the entire service population would end up with any profit for the entity. In actuality, the service costs vary greatly from one person to another, depending on a wide range of external factors such as age, gender, smoking status, lifestyle such as exercise habits, diet, daily hours of sleep, family medical history, and numerous other attributes that influence the amount of health insurance claims regarding many levels of medical procedures, regimens, and/or medicines, of which costs greatly vary.

Further with respect to the cases of healthcare insurance, the trend that the aforementioned healthcare costs rise more rapidly than before emphasizes the need of accurate prediction of the service cost, because the healthcare insurance would need to maximize profits based on the accurate prediction of service cost, in order to set the insurance premiums in balancing affordability for the health insurance enrollees, represented by the members 109 in FIG. 1, and profitability for the entity providing the health insurance. Accordingly, ways to accurately price the actual healthcare cost of the members 109 across all cohorts, including, but not limited to, men, women, children, elders, healthy, and chronically-ill, at an individual level are in great need to keep the insurance premiums in optimum level to balance profitability and competitiveness against other health insurance providers. Such ways to accurately predict service cost for all members 109 would also be utilized by other insurance providers such as automobile insurance and home insurance.

In another example, the PMPM cost 160 for on-demand content streaming services would be subject to a wide range of service cost depending on individual viewing habits regarding timeframe and frequency, preference in certain contents associated with respective licensing and/or production costs, preference on additional services such as foreign language audio track and subtitles, preference on a certain technical specification such as level of resolution of the content that corresponds to a certain network bandwidth for delivery and the storage requirements to store the content, and numerous other factors. The service cost would include costs of infrastructure such as computing equipment to process requests for content, data repository for the content, and network bandwidth to deliver the content, which also can vary significantly based on when and how those resources are utilized. Providers of such on-demand content streaming services can greatly benefit from accurately predicting the PMPM cost 160 by creating a certain tier of service fees for a cohort amongst the members 109 based on the PMPM cost 160, without pooling the entire cost of the service provider for all of the members 109.

The data sources 140 include various sources of information describing characteristics and/or activities of the members 109 that are relevant to usage of the subscribed service by the members 109 and characteristics thereof, which can influence the PMPM cost 160. The members 109, directly or indirectly via other related entities, provide any information on the members 109 in the data sources 140 in full consent and in accordance with governing regulations. Details of the data sources 140 are presented in FIG. 2 and corresponding description.

The PMPM cost prediction engine 120 produces the prediction model ensemble 130 based on information from the data sources 140 by use of the one or more machine learning tools 150, which include classification tools, regression analysis tools, data mining and processing tools for big data, and any other computerized tools that are common in machine learning technology. Detailed operations of the PMPM cost prediction engine 120 are presented in FIG. 3 and corresponding description.

The prediction model ensemble 130 for predicting the PMPM cost 160 includes various prediction models that contribute to the PMPM cost 160 in varying degrees over time. In this specification, term "model" indicates an interconnected group of nodes, each of which represents a variable indicating a label and a value. In a model, independent variables, also referred to as predictors, are operatively coupled to other nodes representing other independent variables in a topology configured to influence the prediction as an outcome that is a dependent variable, which is related to and determined by the independent variables. In this specification, terms predictors, independent variables, attributes, features, covariates, and vectors interchangeably indicate a label and a corresponding value contributing to a prediction of the dependent variable, which is the PMPM cost 160. The machine learning tools 150 coupled to the PMPM cost prediction engine 120 determines topologies of respective models.

In certain embodiments of the present invention, connections amongst the nodes in component models of the prediction model ensemble 130 are weighted based on recency of the node value, indicating that newer data contributes more in predicting the PMPM cost 160 than older data, according to the embodiments of the present invention presented herein. The prediction model ensemble 130, as a whole or for certain components thereof, evolves over time based on continuous influx of information from the data sources 140 in order to keep the prediction of the PMPM cost 160 accurate.

The machine learning tools 150 also performs known statistical techniques common in machine learning modeling in generating the prediction model ensemble 130. Particularly, regression modeling, also referred to as regression analysis, which estimates the relationships between independent variables and the dependent variable, is one of the most common types of machine learning models and is performed by the machine learning tools 150. Accordingly, the scope of details provided in this specification on regression modeling would be limited to the aspects that are specific to embodiments of the present invention. Details of the prediction model ensemble 130 are presented in FIG. 2 and corresponding description.

Certain embodiments of the present invention provide a computerized statistical processing system that models use patterns of a subscribed service by the members 109 evolving over time, which produces more accurate prediction of per member cost than conventional prediction models. In order to improve the accuracy of the prediction, the prediction model ensemble 130 to predict the PMPM cost 160 takes age of data into account and favors newer data by time-based weighting of all independent variables in the prediction model ensemble 130 where applicable. In the same embodiments, the prediction model ensemble 130 initially employs all independent variables available from the data sources 140 and then eliminates independent variables that have little predictive relationship with the PMPM cost 160. In the same embodiments, the prediction model ensemble 130 provides a way to separate extreme data values that can skew the prediction of the PMPM cost 160 as well as to integrate the same extreme data values into the prediction of the PMPM cost 160 in a manner that improves accuracy thereof.

In this specification, the description uses naming conventions that are not designed to be interpreted through restrictive or constrained means, largely due to the fact that the names referring elements of the system are designed to be adopted in collaboration with specific embodiments of the present invention. Additionally, embodiments of the present invention include several models and methodologies with corresponding benchmarks and cohorts of population. It is not intended that any single component of which is accountable for the desired outcome or which is critical to practice such embodiments of the present invention herein described.

In this specification, the system of methods consists of various models that complete the end-to-end methodology, as described in detail below. As facts may be known to a person having ordinary skill in the art, each model is made of a sequence of code that creates subroutines, procedures, classes, and functions that can be fulfilled either through Object Oriented Programming (OOP) or pure scripts. These individual components are then compiled into an executable program, and multiple such programs are then organized together to complete the model. Therefore, for simplicity, descriptions of each model is described at its functional-level, and it is possible that the components within can be re-written or re-created using other means. In addition, the processes within each model may be redirected, merged, or repackaged into libraries and be leveraged by other models.

In this specification, for certain embodiments of the present invention, at a technical level, may be created with a wide selection of tools. The system of models, as an example, may be written in Python, C++, Java, R, and be executed on any widely accepted operating system in the computer technology, such as Windows OS, Macintosh OS, and Linux. These programming languages and operating systems are widely known by the public and accepted in the computer industry where built-in compliers are available to create executable files from the code itself.

In one or more embodiments of the present invention, the system and methods presented herein have constraints of leveraging protected member data. Data privacy takes higher priority and has been followed and conformed to with governing regulations for the protection of privacy and integrity of information of the members subscribing the service subject to modeling.

In one or more embodiments of the present invention, the system and methods provided herein utilize complex multi-layered data structure where the illustration of results, data structure, derived analytical result itself are separate. Nevertheless, such data structure are still highly correlated and can be traced to their origins in the data source, maintaining a high level scalability in the data structure, consistency and reliability while maintaining the best possible extent of data integrity.

Figure 2:
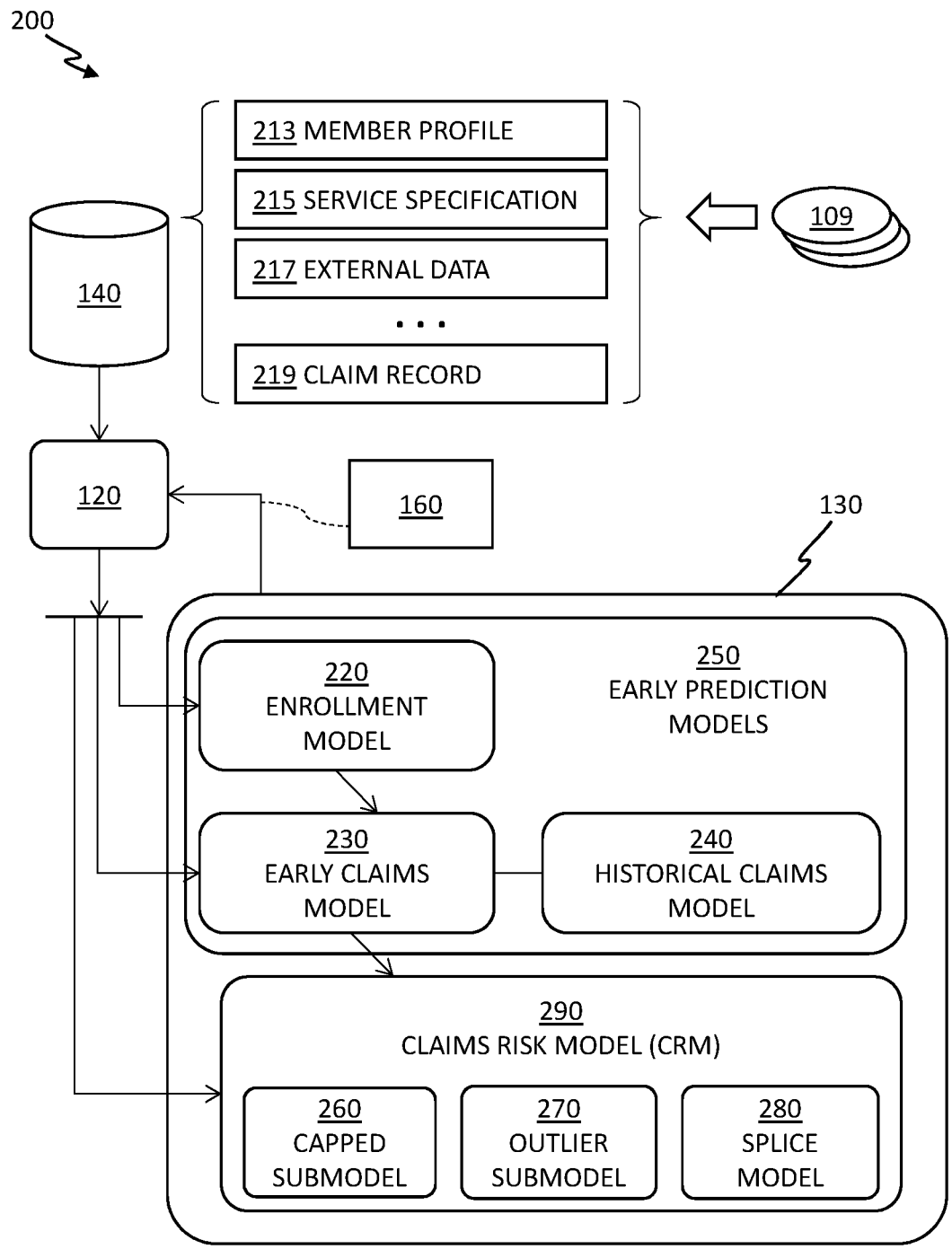
FIG. 2 depicts components of the prediction model ensemble and the data sources of FIG. 1, in accordance with one or more embodiments set forth herein.

FIG. 2 depicts components of the prediction model ensemble 130 and the data sources 140 of FIG. 1, in accordance with one or more embodiments set forth herein.

The data sources 140 include multiple sources of information that influence the PMPM cost 160. The data sources 140 indicate respective origins of information that can be mined over time by the PMPM cost prediction engine 120 to generate a big data scale of influx with information for training, testing, and retraining for components models of the prediction model ensemble 130. With respect to the operations by the PMPM cost prediction engine 120 in producing the PMPM cost 160, the data sources 140 store information including member profiles 213, service specifications 215, external data 217, and claim record 219, which will be collected by the PMPM cost prediction engine 120.

Each of the member profiles 213, the service specifications 215, the external data 217, and the claim record 219 is represented as a combination of numerous variables, some may overlap. The entire set of variables of respective types 213, 215, 217, 219 are filtered from originating data sources 140 based on certain preconfigured model selection criteria that is suitable for predicting the PMPM cost 160 with optimal accuracy. The scope of variables presented in the selection criteria are wide enough to allow certain margin of errors in the data sources 140 with respect to data quality, data error, diagnosis error, communication error, and certificate error on unknown data sources. Each of the variables, however, should have some extent of deterministic predictive significance relevant to the PMPM cost 160 from a certain perspective in order to be included in an initial pool of variables for modeling of any component models in the prediction model ensemble 130.

The member profiles 213 originate from the members 109 upon subscribing for the service that is offered by a service provider. The information provided in the member profiles 213 includes basic personal information, such as demographic information, age, gender, geographical area of residence, and any information specific to the subscribed service. In embodiments for a health insurance service, the member profiles 213 include, in addition to the basic personal information, any member cohort characteristics relevant to a risk of the member 109 making a health insurance claim, such as, smoking status, age-gender interaction, age-smoking status interaction, gender-smoking status interaction, and other socio-economic, behavioral, and medical attributes. As noted, the member cohort characteristics listed above are used as a determining factor to group the members 109 into a cohort that will be utilized in predicting the PMPM cost 160 on per-member basis. In the same embodiments, the determining factor of the cohort is based on claims risk indicating how often the members 109 of the cohort would require healthcare services and what kind of healthcare the members 109 of the cohort would need to be covered by the subscribed health insurance, respectively.

The service specifications 215 often originate from the service provider because the service specifications 215 describe details of the service that is being subscribed to by the members 109, including, but not limited to, terms and conditions of the service, service fees on the members 109 in compensation of the service provided, procedures in how to use the service, and respective rights and obligations of both the service provider and the members 109. In the same embodiments for the health insurance service as above, the service specifications 215 describe information on coverage of the health insurance including, but not limited to, a network type, benefits selections, claims benefit factor, co-pay amount, deductible amount, and underwriting flag. In the same embodiments for health insurance service, the service specifications 215 can be obtained from the health insurance provider of a particular insurance product enrolled by the members 109 or a governing agency in possession of collective health insurance policy information from many health insurance providers.

The external data 217 indicates data relevant to the subscribed service and the PMPM cost 160 that originate from all entities other than the members 109 and the service provider. The external data 217 may not be inconsistent with either the member profiles 213 or the service specification 215, depending on the trustworthiness of individual external entity, data synchronization, or other quality metric. Nevertheless, the external data 217 is generally good information in the context of the subscribed service and will be utilized in modeling and training the prediction model ensemble 130 for prediction of the PMPM cost 160. In the same embodiments for the health insurance service as above, the external data 217 include, but are not limited to, Federal Poverty Level (FPL) metric by the U.S. Department of Health and Human Services (HHS), HHS geographic rating areas, FPL-age interaction, prescription drug plan enrollment percentile, any other socio-economic statistical information, any particular medical statistical information per categories of diseases and ailments, behavioral characteristics and lifestyle indicators on wellness and health of individuals, nationwide statistical information on health insurance coverage, and statistical information on government-subsidized healthcare and medical aids for certain target population. In addition, the PMPM cost prediction engine 120 collects any types of available information that is useful to interpret the member profile 213, the service specification 215, and/or the claim record 219 with respect to the PMPM cost 160 for any cohorts amongst the members 109 by automated data mining and any other data collection mechanism.

The claim record 219 originates from usage of the subscribed service by the members 109 over time. As opposed to the member profile 213, the service specification 215, and the external data 217, which are initially available upon subscription of the service, the claim record 219 does not have any usable dataset in the beginning of the subscription. In this specification, term "member tenure", or simply a "tenure", indicates a duration of the subscription by individuals of the members 109 in units of years and months. Although nonexistent upon subscription, as respective tenures of the members 109 increase over time, the claim record 219 would also increase in volume and would be accounted more and more amongst all data from the data sources 140 in predicting the PMPM cost 160 as a collection of the most significant predictors in the prediction model ensemble 130. Also, if the members 109 had subscribed to any services similar to the subscribed service in the past and any usage dataset from such previously subscribed to similar services is available as part of the external data 217, the usage dataset from the past services can be employed in predicting the PMPM cost 160. In the same embodiments for the health insurance service as above, the claim record 219 includes details of all health insurance claims submitted for the member 109, including, but not limited to, amount billed by healthcare providers, amount paid out to healthcare providers, nature of visits, and diagnoses and procedure codes.

As noted above, the PMPM cost prediction engine 120 collects information of the member profile 213, the service specification 215, the external data 217, and the claim record 219 from the data sources 140 and trains the prediction model ensemble 130 that predicts the PMPM cost 160. The prediction model ensemble 130 includes early prediction models 250 and a claims risk model (CRM) 290. The early prediction models 250 include an enrollment model 220, an early claims model 230, and a historical claims model 240. The CRM 290 includes a capped submodel 260, an outlier submodel, and a splice model 280.

The CRM 290 is regarded as a mature prediction model which operates on datasets from multiple years, particularly the claim record 219 during the tenure, as the tenure of the members 109 progresses longer than a certain minimum number of years in the tenure, while the early prediction models 250 utilizes a dataset initially available at the time of subscription or another dataset of early claims in the early months and years of the tenure of the members 109 that is less than the minimum number of years in the tenure of the CRM 290. In the prediction model ensemble 130, the early prediction models 250 and the CRM 290 include overlapping variables such that any changes to the datasets of the early prediction models 250, for example, a member address from the member profile 213, would be reflected in the CRM 290. Because the PMPM cost prediction engine 120 utilizes datasets by all of the members 109 having respective tenures that are either subject to the early prediction models 250 or subject to the CRM 290, as a simultaneously available snapshot of all of the datasets, the PMPM cost prediction engine 120 trains the early prediction models 250 and the CRM 290 back to back as described in FIG. 3 and corresponding description.

The early prediction models 250 include an enrollment model 220, an early claims model 230, and a historical claims model 240. The PMPM cost prediction engine 120 trains the enrollment model 220 based on the member profile 213, the service specification 215, and the external data 217 upon subscription of the service by the members 109. As noted earlier, each piece of data with a label and corresponding value, forms a named node indicating a variable that has a value of the data. The enrollment model 220 has several hundreds to a thousand interconnected nodes and corresponding values that respectively represent each piece of data from the member profile 213, the service specification 215, and the external data 217. Based on the member profile 213, the PMPM cost prediction engine 120 can optionally assign the member 109 to a cohort of a preconfigured condition, such as gender, age, or gender-age interaction.

The enrollment model 220 produces a prediction of a first PMPM cost at the time of subscription. When the tenure of the members 109 is at the beginning, the first PMPM cost as predicted by the enrollment model 220 would be used as the PMPM cost 160 produced by the prediction model ensemble 130, because no data with which to run other component models of the prediction model ensemble 130 is available to predict the PMPM cost 160 in any other way. The first PMPM cost predicted by the enrollment model 220 is for the members 109 into a few months in the first year of the tenure. The first PMPM cost predicted by the enrollment model 220 is a prediction of cost incurred by the member 109 up to a current number of months in the first year of tenure.

The early claims model 230 takes a first set of variables that are likely predictive for the PMPM cost 160 based on past predictions as trained by the enrollment model 220 as an input and adds data of the claim record 219 that have been generated up to the current number of months in the first year of the tenure, in predicting a second PMPM cost that is a cost prediction for the remainder of the first year of the tenure. Concurrently with the early claims model 230, the historical claims model 240 produces a third PMPM cost that is a prediction of cost incurred by the members 109 in the second year of tenure. The historical claims model 240 is a conventional prediction model that predicts the cost for the entire population of the members based on the average of the total cost, often using a few of traditional variables such as gender, age, smoking status, and claim record from past twelve months.

The CRM 290 is a mature model for predicting the PMPM cost 160 that is trained and tested with a certain preconfigured number of years' worth of the claim record 219 as well as inputs of a second set of variables that are likely predictive for the PMPM cost 160 based on past predictions as trained by the early claims model 230. The CRM 290 includes respective variables and corresponding values of the claim record 219, in addition to the collective variables of the early prediction models 250. Certain variables from the early prediction models 250 and the CRM 290 may be redundant as being scalable to other variables, one of which can be removed from the CRM 290 upon addition. Still, the CRM 290 would have variables respectively representing each piece of data in the claim record 219 in addition to all variables of the early prediction models 250. In the same embodiments for the health insurance service as above, single visit to the doctor's office can generate a few dozen pieces of data to be represented in the CRM 290 as variables and respectively corresponding values, in areas of basic patient information, a type of doctor, a name of clinic, the nature of visits, symptoms, all fundamental vital sign measurements and readings, diagnosis, prescription, lap tests, procedures, billing code, co-pay amount, billed amount, preapproval, etc.

Earlier, the enrollment model 220 has been noted as having several hundreds to a thousand interconnected nodes that respectively represent each piece of data, a label, and a corresponding value, from the member profile 213, the service specification 215, and the external data 217. Accordingly, the CRM 290 would end up with quite numerous variables in the beginning, and because some of the variables would not be a good predictor of the PMPM cost 160, the PMPM cost prediction engine 120 would eliminate some weak predictors to optimize the CRM 290 without any loss of accuracy in prediction. In eliminating the variables, the PMPM cost prediction engine 120 utilizes time-based weight in determining a coefficient of each variable such that newer data would contribute more to the PMPM cost 160 than older data. A process known as "backward selection" indicates such method of selecting features common in statistical modeling. Backward selection is also referred to as variable pruning or simply variable selection in this specification.

The CRM 290 is initially a collection of aforementioned variables, which derives a capped submodel 260, an outlier submodel 270, and a splice model 280 by the operations of the PMPM cost prediction engine 120. The capped submodel 260 and the outlier submodel 270 are based on a same preconfigured cap, a cap, or a threshold, for an amount of single claim from variables in the claim record 219. The same training dataset is modified by use of the preconfigured cap distinctively for the capped submodel 260 and the outlier submodel 270. The CRM 290 is based on the capped submodel 260 and the outlier submodel 270 in order to identify the effect of extreme amount of single claims that are captured in the outlier submodel 270 on predicting the PMPM cost 160 and to adjust the PMPM cost 160 per cohort accordingly. The splice model 280 produces the PMPM cost 160 of the CRM 290 by combining one PMPM cost predicted by the capped submodel 260 and another PMPM cost predicted by the outlier submodel 270 in a manner that PMPM costs predicted by the splice model 280 fall between the respective PMPM cost predictions by the capped submodel 260 and the outlier submodel 270 would approximate actual instances of the claim record 219.

In the CRM 290, training of the capped submodel 260 and the outlier submodel 270 with modified datasets based on the cap is to prevent outlier datapoints from influencing the prediction, particularly the cases where a few extremely large outlier datapoints skews the prediction for the entire population of the members 109. The splice model 280 of the CRM 290 is to treat the two discrete predictions made by the capped submodel 260 and the outlier submodel 270 as a single semi-continuous distribution.

Figure 5:
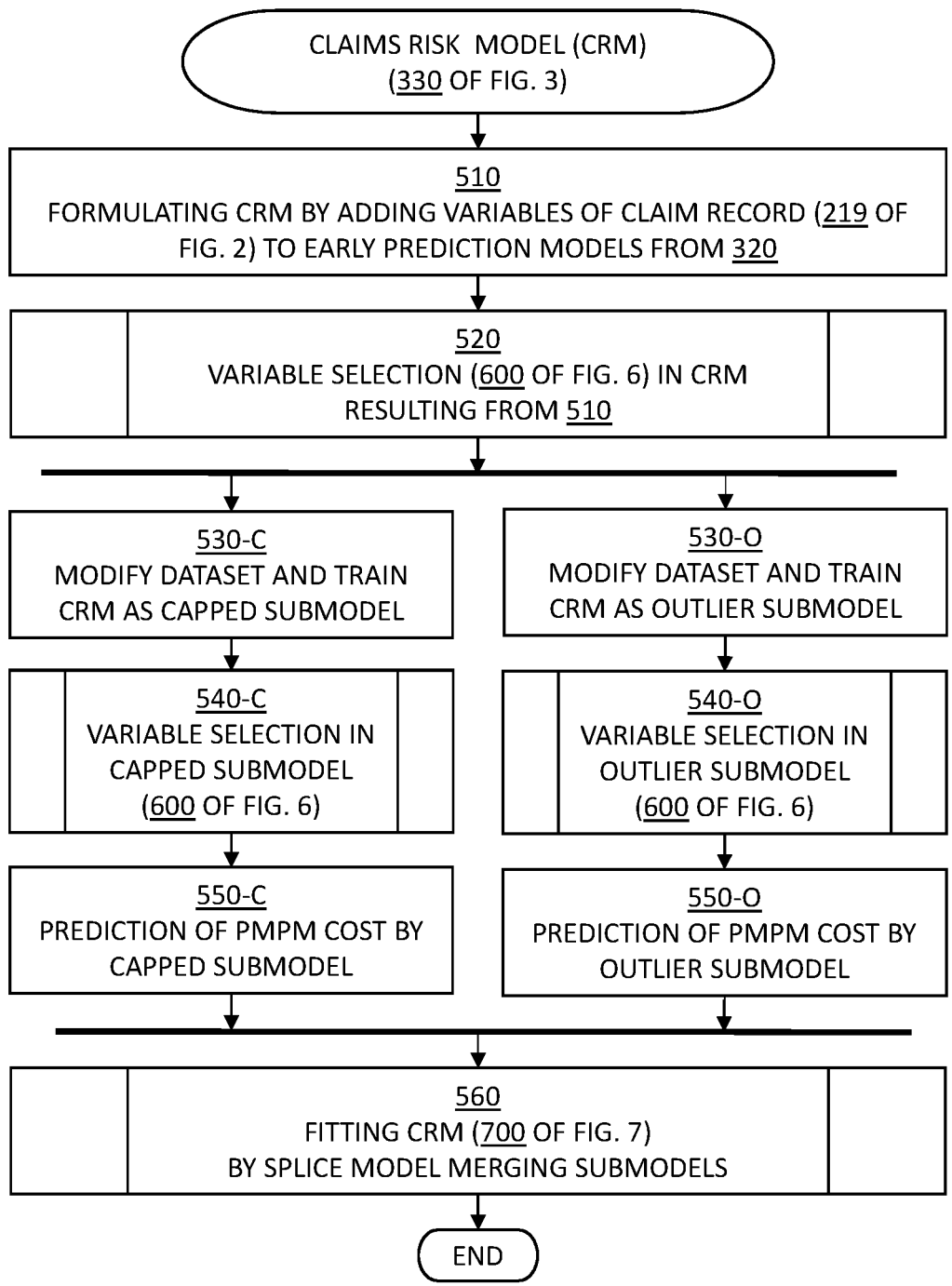
FIG. 5 depicts a flowchart for claims risk modeling as performed by the Per Member Per Month cost prediction engine, in accordance with one or more embodiments set forth herein.
Figure 7:
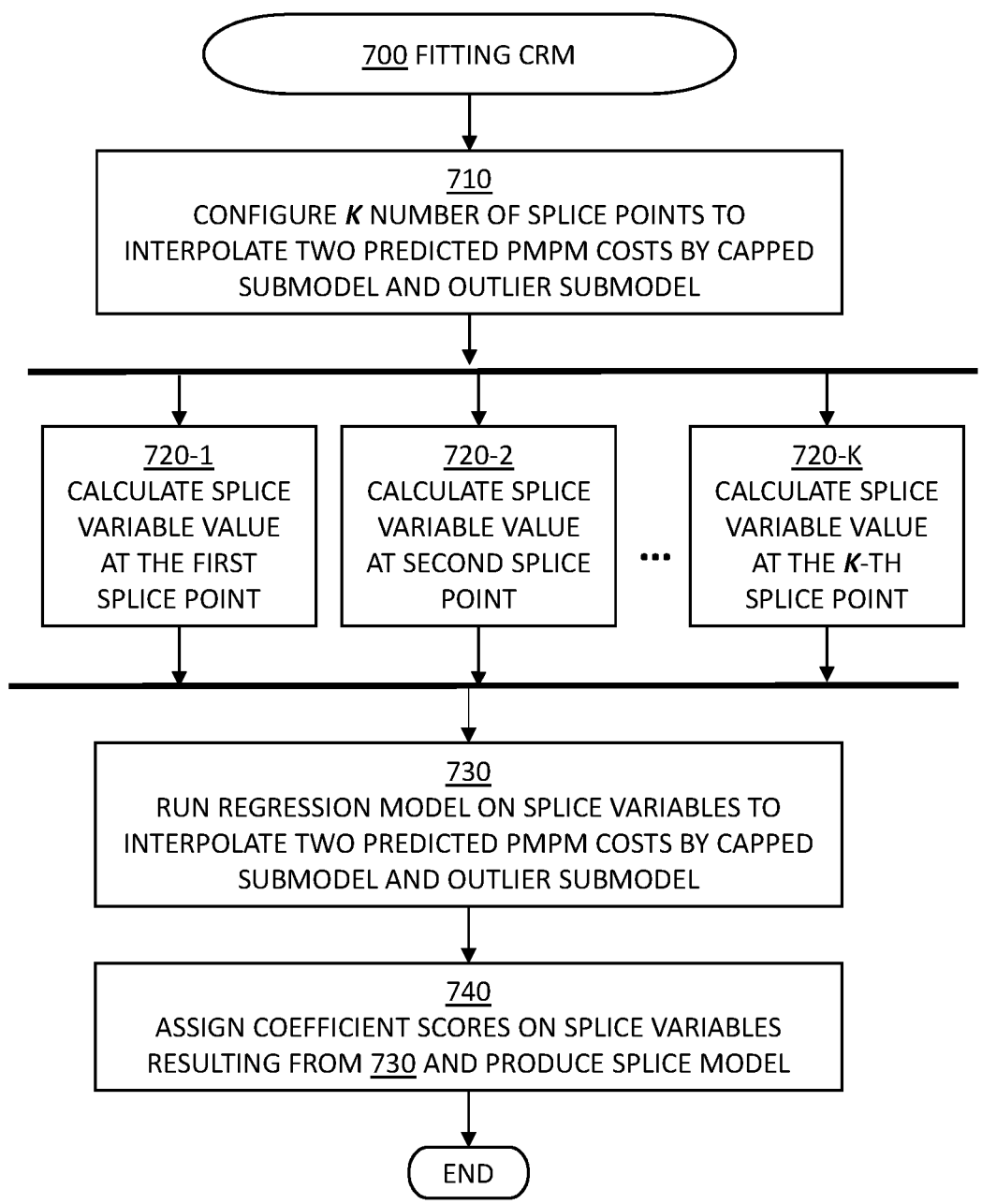
FIG. 7 depicts a flowchart for fitting the claims risk model by splicing predictions by submodels as performed by the Per Member Per Month cost prediction engine, in accordance with one or more embodiments set forth herein.

Details of the capped submodel 260 and the outlier submodel 270 of the CRM 290 are presented in FIG. 5 and corresponding description, and details of the splice model 280 of the CRM 290 are presented in FIG. 7 and corresponding description.

The variables from the claim record 219 demonstrate the highest significance level in predicting the PMPM cost 160 as the tenure progresses. Accordingly, the variables from the early prediction models 250 would take up less and less number of variables in the prediction model ensemble 130 until the prediction model ensemble 130 achieves a balanced state in which no more variables are eliminated when the CRM 290 is retrained with evolving datasets as the tenure is sufficiently lengthy.

In training the component models of the prediction model ensemble 130, the PMPM cost prediction engine 120 uses dataset on all of the members 109. As noted in FIG. 1 description, a cohort of any individual member amongst the members 109 represents the individual member in training the prediction model ensemble 130 such that the component models of the prediction model ensemble 130 would be robust and predictive enough based on a large volume of training dataset and testing dataset, according to basics of machine learning. The prediction model ensemble 130 is validated also based on dataset for all of the members 109 for each individual member. For example, if the PMPM cost 160, as predicted by the PMPM cost prediction engine 120 using the prediction model ensemble 130, is within a range of acceptable margin of error from an actual PMPM cost incurred by the member during a unit period, often a year, for a certain preconfigured ratio out of the entire population of the members 109, then the prediction model ensemble 130 is regarded as accurate enough for predicting the PMPM cost 160 for the subscribed service.

In the same embodiments for health insurance service, the variables from the enrollment model 220 is only available to predict the PMPM cost 160 for a newly subscribed member, or a new enrollee, from the members 109. When the new enrollee starts claiming benefits, as represented in the claim record 219, the variables of the enrollment model 220 will be significantly less predictive, and as the tenure progresses, the variables of the CRM 290 will take up more and more proportion in the number of variables in the prediction model ensemble 130. Accordingly, the prediction model ensemble 130 is regarded as evolving through time along with the tenure of the members 109, while at any stage in the tenure, the PMPM cost 160 can be predicted based on varying datasets and variables that are most predictive at each stage of the tenure.

The component models of the prediction model ensemble 130 are retrained continuously in parallel with real time changes in instances of data from the data sources 140. Data flows from the data sources 140 to the PMPM cost prediction engine 120 is continuous and massive, as the data flows are for each of the members 109 in the millions, and a number of variables and corresponding values, collectively data points, or nodes in component models of the prediction model ensemble 130 for each member is often several hundreds to a thousand. In embodiments of the present invention, respective component models of the prediction model ensemble 130 are implemented as a multivariate model, a regression forest or other decision-tree based model, a neural network, or any other specific topology depending on the requisite complexity, as selected by the machine learning tools 150.

Conventionally, health insurance cost prediction models use a limited scope of static data in a simple modeling method based on an average cost of the entire population of enrollees or an aggregation of average costs for groups of enrollees based on demographic grouping. However, the health insurance cost is affected by many other factors that are not subject to conventional prediction modeling, but the simplicity of conventional health insurance cost prediction models prevents even the most predictive data from being modeled if it behaves differently from other static data modeled in the conventional health insurance cost prediction models. Consequently, the cost predicted by the conventional models often does not accurately reflect actual costs for health insurance entities. Embodiments of the present invention utilizes most of data predictive of the cost by employing the prediction model ensemble 130 having various component models and by including all applicable data and then pruning the variables based on respective significances to the prediction, as described herein, such that the embodiments of the present invention overcome aforementioned drawbacks of the conventional single prediction model methods and improve accuracy of the prediction.

In conventional health insurance cost prediction models, because only a limited scope of the static data is modeled as noted above, the prediction by the conventional health insurance cost prediction is limited to a certain group of members who meets the conditions for modeling. Conventional cost prediction models also neglect a predictive impact of time progression in the tenure of the members and age of service usage data, that is, the claim record 219. Accordingly, the conventional cost prediction methods could not properly represent all members who can incur cost to the service provider over time in the prediction of the cost. Embodiments of the present invention enable modeling of all population of the members 109 by not limiting modeled population, which improves the accuracy of the prediction. Embodiments of the present invention further employ time-based weighting of dataset such that the prediction model ensemble 130 would consistently evolve over time in accordance with a trend in the claim record 219 by making newer data more predictive of the predicted cost.

Conventional cost prediction modeling does not address issues of long-tailed distribution in the claim record 219, in which a small number of high-cost claims appear asymptotically; thus the higher the cost of a claim, the smaller the number of such claims. As noted above, the presence of high cost claims, no matter how rare, can greatly impact the average cost of the entirety of the members 109 and the accuracy of the cost prediction, but convention cost prediction modeling is too simple to address the issues with the long-tailed distribution, or simply a long-tail problem. Embodiments of the present invention address the aforementioned long-tail problem by employing the capped submodel 260 and the outlier submodel 270 of the CRM 290 and interpolating respective predictions from the two submodels 260 by use of the splice model 280 such that the long-tail problem is addressed in a manner that improved the accuracy of cost prediction for all cohorts of the members 109.

Figure 3:
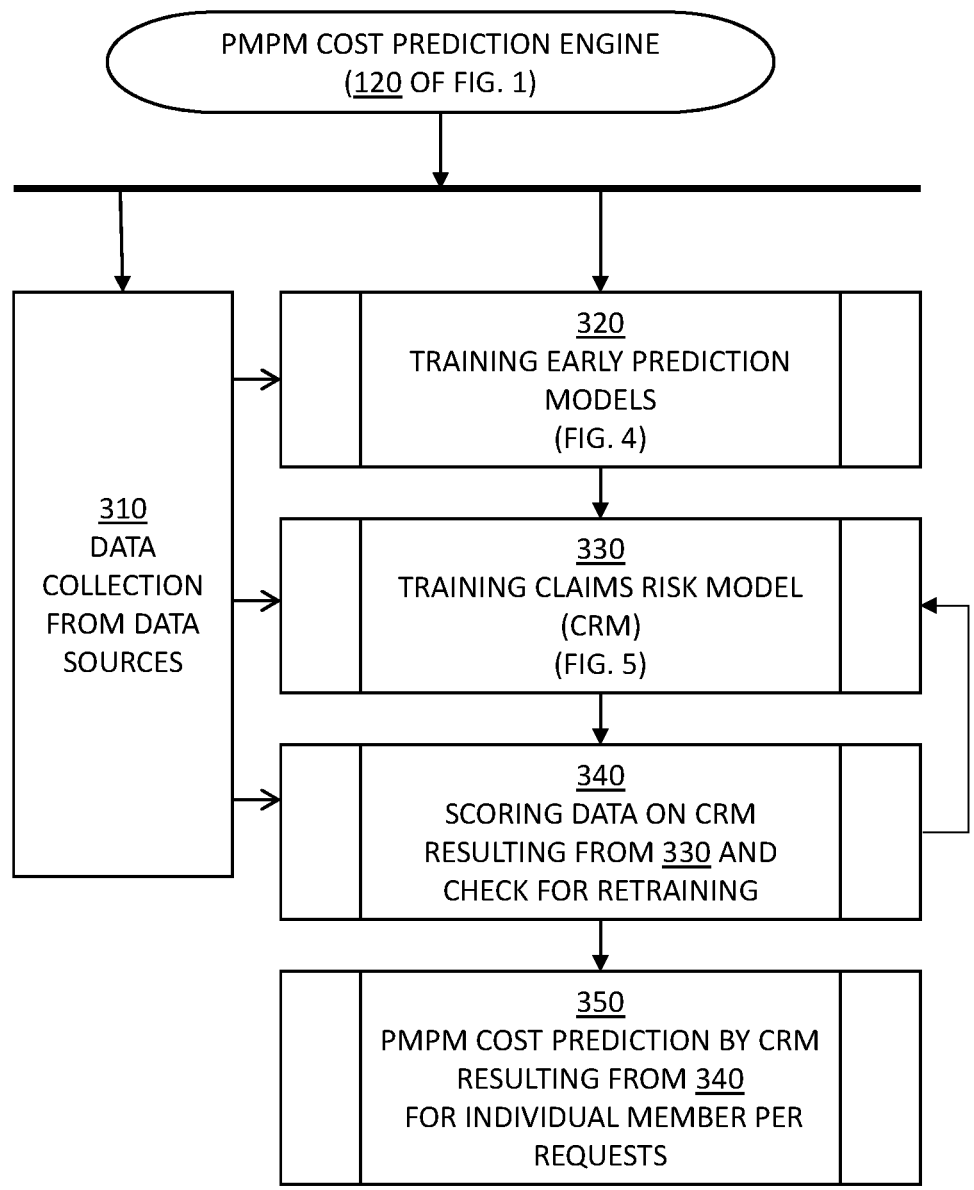
FIG. 3 depicts a flowchart of operations performed by a Per Member Per Month cost prediction engine of FIG. 1, in accordance with one or more embodiments set forth herein.

FIG. 3 depicts a flowchart of operations performed by the PMPM cost prediction engine 120 of FIG. 1, in accordance with one or more embodiments set forth herein.

In block 310, the PMPM cost prediction engine 120 collects datasets respective to the early prediction models 250 and the CRM 290 from the data sources 140 for modeling and testing of respective models. As described herein, component models of the early prediction models 250 and the CRM 290 are trained with respective datasets of members with a certain range of tenure of the membership, for example, the enrollment model 220 is for members with no tenure upon subscription, the early claims model 230 is for members of the first nine months of each year during the first year of tenure, and the CRM 290 is for members of at least a year of tenure.

Block 310 runs concurrently with blocks 320 through 340. In certain embodiments of the present invention, block 310 can be implemented as a separate data mining tool from blocks 320 through 340, because block 310 participates training of the respective models only by providing respectively corresponding datasets for the early prediction models 250 and the CRM 290. The data mining functionality of block 310 can be provided by, for example, a data mining tool in the machine learning tools 150, or any other big data applications. Block 310 is described herein to illustrate that, in training of the respective models of the early prediction models 250 and the CRM 290, blocks 320 through 340 will obtain respectively corresponding datasets for the respective models of the prediction model ensemble 130.

In this specification, each data source of the data sources 140 is configured to collect data and feed block 310 of the PMPM cost prediction engine 120, independently and autonomously. As noted earlier, the influx of data from the data sources 140 to the PMPM cost prediction engine 120 is continuous and massive. Accordingly, PMPM cost prediction engine 120 has access to latest instances on datasets corresponding to respective component models of the prediction model ensemble 130.

In block 320, the PMPM cost prediction engine 120 trains the early prediction models 250 based on dataset corresponding to a group amongst the members 109 having no tenure to a short tenure, for example, less than a year in certain embodiments of the present invention. A length of the tenure separating the early prediction models 150 from the CRM 290 can be dynamically configured. Detailed operations of block 320 are presented in FIG. 4 and corresponding description. Then, the PMPM cost prediction engine 120 proceeds with block 330.

In training component models of the prediction model ensemble 130, the PMPM cost prediction engine 120 utilizes the machine learning tools 150. As noted earlier, the machine learning tools 150 for modeling determine how the nodes representing respective variables of the dataset are interconnected in each component model of the prediction model ensemble 130, that is, a topology of each component model. In modeling each component model of the prediction ensemble model 130, the PMPM cost prediction engine 120 determines whether or not a variable participates in a model, and how a variable influence an outcome of the model by setting a coefficient value corresponding to the variable.

In block 330, the PMPM cost prediction engine 120 trains the CRM 290 based on outputs from block 320 and dataset corresponding to another group amongst the members 109 having the claims record 219 enough to train the CRM 290. In the same embodiments of the present invention as above, the CRM 290 is trained with dataset of a full year or more. Detailed operations of block 330 are presented in FIG. 5 and corresponding description. Then, the PMPM cost prediction engine 120 proceeds with block 340.

In cases where the PMPM cost prediction engine 120 performs block 330 for retraining, after block 340, to improve performance of the CRM 290, the PMPM cost prediction engine 120 would employ another cap value that is distinctive from the previously used in modifying the datasets for the capped submodel 260 and the outlier submodel 270 such that the predictions made by the splice model 280 would fit better to the actual cost.

In certain embodiments of the present invention, the PMPM cost prediction engine 120 can employ a plurality of the cap values to modify the datasets for the capped submodel 260 and the outlier submodel 270 such that respective performances per cap value in predicting the PMPM cost by many versions of the CRM 290 would be compared and the fittest one can be selected.

In block 340, the PMPM cost prediction engine 120 scores data on the CRM 290 that results from block 330 and checks if the CRM 290 should be retrained based on resulting score. If the CRM 290 scores greater than or equal to a certain preconfigured performance threshold on a new dataset, then the PMPM cost prediction engine 120 proceeds with block 350. If the CRM 290 scores less than the certain preconfigured performance threshold, indicating that the PMPM cost prediction engine 120 does not perform as well as required in predicting the PMPM cost 160, then the PMPM cost prediction engine 120 loops back to block 330 to retrain the CRM 290.

In certain embodiments of the present invention, the CRM 290 is a set of the capped submodel 260, the outlier submodel 270, and the splice model 280. In scoring data on the CRM 290, the PMPM cost prediction engine 120 first applies the new dataset, as modified in blocks 530-C and 530-O, to the capped submodel 260 and the outlier submodel 270, respectively, and obtains a first PMPM cost predicted by the capped submodel 260 and a second PMPM cost predicted by the outlier submodel 270. Then, the PMPM cost prediction engine 120 applies the first PMPM cost predicted by the capped submodel 260 and the second PMPM cost predicted by the outlier submodel 270 to the splice model 280, which will produce the PMPM cost 160 by the CRM 290.

In this specification, "to score data" indicates applying a new dataset distinctive from training datasets to a trained model, that is, the CRM 290. In machine learning models to solve regression problems, the process of scoring data returns estimated averages of the trained model. To score the trained model, a new dataset that comes with a known outcome to which a prediction made by the trained model targets to match or to approximate is applied to the trained model. If the trained model makes a prediction that approximates the known outcome corresponding to the new dataset with an acceptable margin of error, then the trained model can be regarded as predictive enough. The score for the trained model is a performance metric, as the greater the difference between the known outcome corresponding to the new dataset and the prediction made by the trained model, the poorer the performance of the trained model.

In block 350, the PMPM cost prediction engine 120 predicts the PMPM cost 160 for a configured time in the future by use of the CRM 290 resulting from block 340 for individual members per request by the automated subscription management system 110. The configured time for prediction can be differentiated per member or per cohort depending on past trends of changes in the claims record 219, for example, quarterly, semiannually, or annually.

In cases where a PMPM cost for a particular individual member is requested, the PMPM cost prediction engine 120 applies a dataset of the individual member to the CRM 290 by applying the dataset of the individual member as modified in blocks 530-C and 530-O to the capped submodel 260 and the outlier submodel 270, respectively, and obtains a first PMPM cost predicted by the capped submodel 260 and a second PMPM cost predicted by the outlier submodel 270, which are subsequently combined by the splice model 280 that predicts the PMPM cost 160 by the CRM 290 for the individual member.

In certain embodiments of the present invention, the PMPM cost prediction engine 120 is configured to automatically, periodically, or upon triggering event, predict the PMPM costs 160 of next term for respective cohorts amongst the members 109. When a request for an individual member is obtained, then the PMPM cost prediction engine 120 determines to which cohort the individual member belong, and then produces the PMPM cost 160 for the cohort as the PMPM cost 160 for the individual member. For example, the request to predict the PMPM cost 160 of next term for a certain cohort amongst the members 109 is configured to be generated automatically in the automated subscription management system 110 periodically for every six months or a year of tenure of the members 109.

The PMPM cost prediction engine 120 generates a plurality of predictions corresponding to requests for the PMPM costs 160 during respective lifespans, for example, a year, of the component models of the prediction model ensemble 130 by iterating block 350 with the same prediction model ensemble 130. In certain embodiments of the present invention, the PMPM cost prediction engine 120 loops back to block 320 to regenerate all component models of the prediction model ensemble 130 once the respective lifespans of the prediction model ensemble 130 expires. In other embodiments of the present invention, block 340 loops back to block 330 to regenerate the CRM 290, if the lifespan of the CRM 290 expired, or the performance of the CRM 290 needs adjustment regardless of the expiration date. As presented in FIGS. 5 and 6 and respectively corresponding descriptions below, the PMPM cost prediction engine 120 updates the CRM 290 at least yearly with the latest data of the claim record 219 to keep the prediction accurate based on the latest data.

Figure 4:
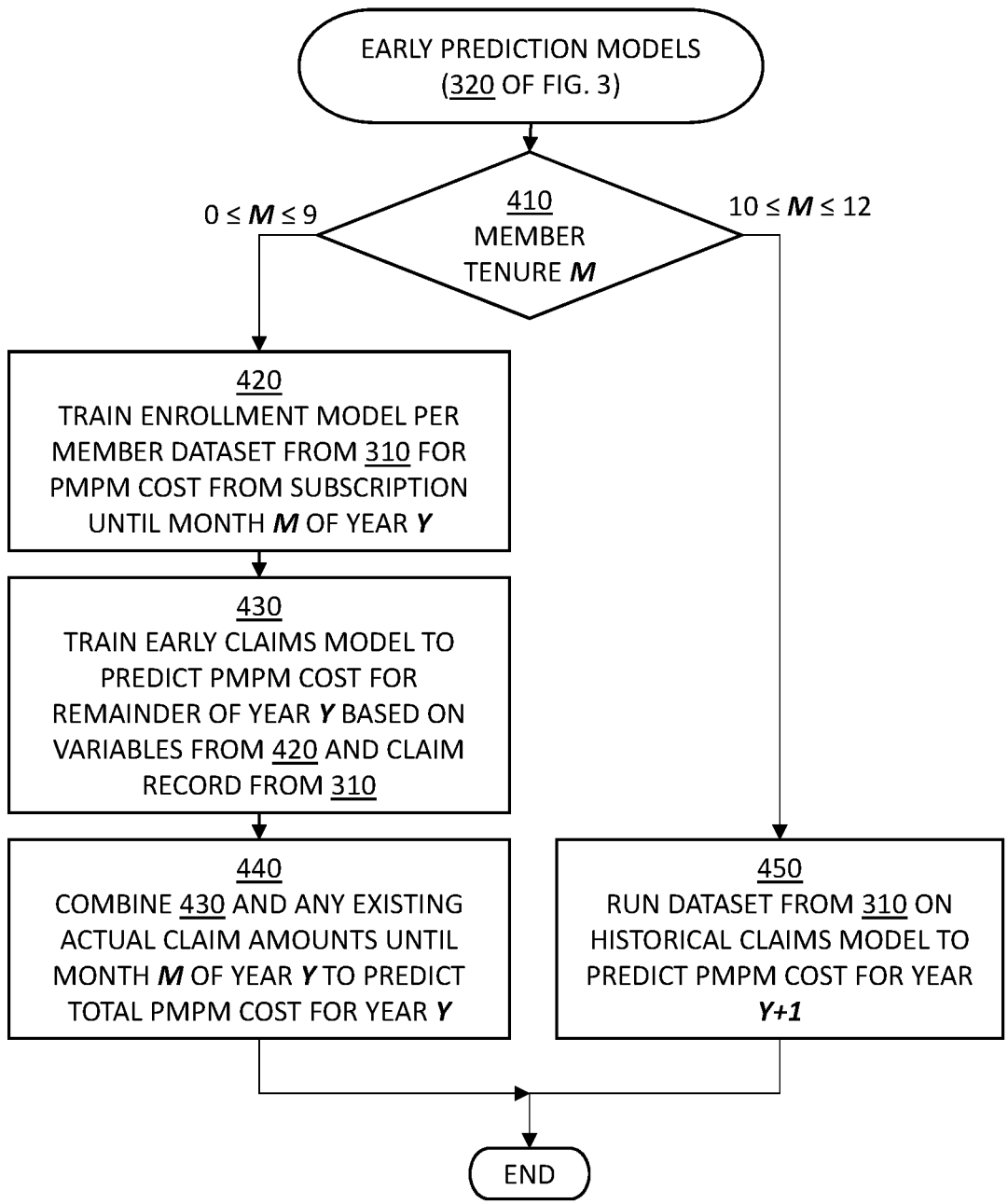
FIG. 4 depicts a flowchart for early prediction modeling as performed by the Per Member Per Month cost prediction engine, in accordance with one or more embodiments set forth herein.

FIG. 4 depicts a flowchart for early prediction modeling as performed by the PMPM cost prediction engine in block 320 of FIG. 3, in accordance with one or more embodiments set forth herein.

In block 410, the PMPM cost prediction engine 120 obtains a dataset of an individual member of their first year of tenure from block 310. The PMPM cost prediction engine 120 then compares the tenure of the individual member, as a number of months since the enrollment, noted as symbol M, with a threshold number of months, which is nine (9) in the embodiment of FIG. 4, to classify the dataset either for training the enrollment model 220 and the early claims model 230 or for predicting the PMPM cost 160 for next year, noted as symbol Y+1. If the PMPM cost prediction engine 120 determines that the tenure of the individual member corresponding to the dataset is less than or equal to the threshold number of months for classification, then the PMPM cost prediction engine 120 proceeds with block 420 for training the enrollment model 220 and the early claims model 230. If the PMPM cost prediction engine 120 determines that the tenure of the individual member corresponding to the dataset is greater than the threshold number of months for classification, then the PMPM cost prediction engine 120 proceeds with block 450 for predicting the PMPM cost 160 for next year.

The PMPM cost prediction engine 120 concurrently runs multiple threads of block 320 of FIG. 3. Accordingly, in a thread of block 320, the PMPM prediction engine 120 performs blocks 410, 420, 430, and 440 if the tenure of the individual member corresponding to the dataset is less than or equal to the threshold number of months for classification. Concurrently, in another thread of block 320, the PMPM prediction engine 120 performs blocks 410 and 450 if the tenure of the individual member corresponding to the dataset is greater than the threshold number of months for classification. Due to the multiplicity of the member tenure corresponding to individual dataset and parallelism in processing multiple datasets from the data sources 140, the number of threads of block 320 can be, theoretically, as many as the number of individual members in the first year of tenure amongst the members 109.

In certain embodiments of the present invention, the PMPM cost prediction engine 120 determines the threshold number of months for classification based on characteristics of use case, that is, what kind of service subscription is subject to the prediction of the PMPM cost 160. In the embodiment of FIG. 4, the PMPM cost prediction engine 120 and the prediction model ensemble 130 are for a use case of health insurance service, in which a yearly accounting and an annual enrollment period are common. Accordingly, the threshold number of months as nine (9) has been configured to be reasonably representative of a year, for being three quarters of a contract term for a year, which can be predictive enough for next year.

In block 420, the PMPM cost prediction engine 120 trains the enrollment model 220 with datasets of the member of tenure shorter than the threshold number of months as determined from block 410. As noted earlier, a dataset corresponding to a member for the enrollment model 220 includes the member profile 213, the service specification 215, and the external data 217, which are most reliable at the time as the member tenure is relatively short. The PMPM cost prediction engine 120 predicts the PMPM cost 160 for the member from subscription until the member tenure month M by use of the enrollment model 220. The PMPM cost prediction engine 120 produces an outcome of the enrollment model 220 as a first set of variables that are likely predictive for the PMPM cost 160 based on past predictions for up to the member tenure month M, as introduced in description of FIG. 2. Then, the PMPM cost prediction engine 120 proceeds with block 430.

In block 430, the PMPM cost prediction engine 120 trains the early claims model 230 based on the claim record 219 from block 310 and the first set of variables generated from block 420. The early claims model 230 predicts the PMPM cost 160 for a remainder of a current year Y, that is, for the months after the member tenure month M until a full year when the number of months is twelve (12). The PMPM cost prediction engine 120 produces an outcome of the early claims model 230 as a second set of variables that are likely predictive for the PMPM cost 160 based on past predictions. Then, the PMPM cost prediction engine 120 proceeds with block 440.

In certain embodiments of the present invention for the health insurance service, the number of months of the tenure is accounted after the number of months has past such that the tenure is represented in a dataset for training the early claims model 230 in block 430.

In block 440, the PMPM cost prediction engine 120 combines the cost for the remainder of year Y as predicted by the early claims model 230 from block 430 and any actual claim amount incurred by the member tenure month M of year Y to predict the PMPM cost 160 for year Y as a whole. Then, the PMPM cost prediction engine 120 terminates training the enrollment model 220 and the early claims model 230 in the early prediction models 250 for the prediction model ensemble 130.

In certain embodiments of the present invention described in FIG. 4, the early prediction models 250 are utilized for predicting the PMPM cost 160 with datasets corresponding to the first year of member tenure, with limited instances of the claim record 219. As the member tenure increases, for example, after second year of the member tenure, the early prediction models 250 would participate in the prediction model ensemble 130 less and less, while the CRM 290 would primarily determine the PMPM cost prediction. However, variables of the early prediction models 250 that are inherent no matter how mature the CRM 290 is, and accordingly, the member profile 213, the service specification 215, and the external data 217 trained for the early prediction models 250 would share a certain proportion of predictive significance for the PMPM cost 160 with the variables of the CRM 290.

In the same embodiments of the present invention for the health insurance service as above, the number of months of the member tenure M is the sole deterministic factor on which the early prediction model 250 is categorized. In the same embodiments of the present invention, the health insurance service for the member is associated with a certain yearly allowance for the member upon subscription, so the prediction of the second PMPM cost by the early claims model 230 would be calculated as a remaining amount from the yearly allowance after the claimed amount up to the number of month of the member tenure M. The actual amount incurred year-to-date (YTD) at month M, presumably when the member tenure begins on January first for yearly coverage as in most health insurance services, would be subtracted from the yearly allowance and the result from block 430, the predicted cost for the remainder of the year, is added for the prediction of cost for year Y in its entirety In block 450, the PMPM cost prediction engine 120 predicts the PMPM cost 160 for next year Y+1, by running a historical claims model with datasets for members with tenure longer than the threshold number of months, nine, of the first year, in the embodiments shown in block 410. Then, the PMPM cost prediction engine 120 terminates processing block 320 and proceeds with block 330 of FIG. 3.

In certain embodiments of the present invention, dataset, in particular with respect to the claim record 219, generated during the tenure longer than the threshold number of months is presumed to be sufficient to represent a full year of tenure, such that the tenure longer than the threshold number of months can be used to predict the PMPM cost for next year Y+1.

In the same embodiments of the present invention for the health insurance service as above, the historical claims model 240 utilized in block 450 is a readily available conventional prediction model that predicts the cost for the entire population of the members, regardless of their respective tenures, based on the average of the total cost, often using a few of traditional variables such as gender, age, smoking status, and claimed amounts from past twelve months of the tenure. The historical claims model 240 employed in block 450 can be, for example, a Hierarchical Condition Category (HCC), which refers to a risk adjustment model used to calculate risk scores to predict future healthcare costs, the Centers for Medicare and Medicaid Services' (CMS) CMS-HCC model used to predict healthcare spending for Medicare Advantage Plan members, based on additional classification factors including but not limited to age, gender, and disability.

FIG. 5 depicts a flowchart for claims risk modeling as performed by the PMPM cost prediction engine in block 330 of FIG. 3, in accordance with one or more embodiments set forth herein.

In block 510, the PMPM cost prediction engine 120 formulates the CRM 290 by adding variables of the claim record 219 to the variables trained by the early prediction models 250 resulting from block 320 of FIG. 3. The PMPM cost prediction engine 120 applies a minimalistic standard of predictive significance for the PMPM cost 160 to the variables of the claims record 219 to add the same variables to the CRM 290. In the same embodiments of the present invention for the health insurance service as above, all variables of the claim record 219, as well as the variables from the early prediction models 250 in block 320 as detailed in FIG. 4, are regarded as predictive enough of the PMPM cost 160 to participate in the CRM 290. Then, the PMPM cost prediction engine 120 proceeds with block 520.

In block 520, the PMPM cost prediction engine 120 eliminates variables that do not contribute to prediction of the PMPM cost 160 to a certain level from the CRM 290 resulting from block 510 by multi-stage regression. In eliminating the variables from the CRM 290, the PMPM cost prediction engine 210 employs a process known as backward selection, also referred to as variable pruning, in which variables are first included in a model and then removed from the model based on a selective condition. The PMPM cost prediction engine 120 utilizes the backward selection in combination of multi-stage regression of the CRM 290, as well as applying a specific standard on the significance level and stability of a variable in removing the variable from the CRM 290. Detailed operations of the variable selection in block 520 are presented in FIG. 6 and corresponding description. Then, the PMPM cost prediction engine 120 proceeds with blocks 530-C and 530-O in parallel.

The PMPM cost prediction engine 120 processes the capped submodel 260 and the outlier submodel 270 in parallel. The PMPM cost prediction engine 120 performs blocks 530-C, 540-C, and 550-C in sequence for the capped submodel 260. Similarly, the PMPM cost prediction engine 120 performs blocks 530-O, 540-O, and 550-O in sequence for the outlier submodel 270. Blocks 530-C, 540-C, and 550-C processing the capped submodel 260 and blocks 530-O, 540-O, and 550-O processing the outlier submodel 270 progress independently from each other. The PMPM cost prediction engine 120 proceeds with block 560 when both block 550-C and block 550-O are completed.

By training separately and predicting respectively by the capped submodel 260 and the outlier submodel 270, the PMPM cost prediction engine 120 addresses the issues caused by outlier datapoints in distribution, that include skewed and mislead training process of a single model, that is, the CRM 290, which results in longer training times and less fitting model, producing inaccurate results, that is, the PMPM cost 160.

In block 530-C, the PMPM cost prediction engine 120 modifies datasets for the capped submodel 260 based on a preconfigured cap value of cost and then trains the CRM 290 resulting from block 520 with the modified datasets. The preconfigured cap value of cost is set as a large enough value to separate outlier costs from the rest of costs in the datasets. The PMPM cost prediction engine 120 can use the capped submodel 260 for predicting a PMPM cost for the capped submodel 260 subsequent to block 530-C. Then, the PMPM cost prediction engine 120 proceeds with block 540-C.

The PMPM cost prediction engine 120, in block 530-C, modifies datasets for training the capped submodel 260 by changing costs for individual members in the datasets that is greater than the preconfigured cap value to the preconfigured cap value. Accordingly, the datasets modified for the capped submodel 260 have only costs for individual members less than or equal to the preconfigured cap value, indicating any extreme costs for individual members have been removed from the datasets. For example, if an original dataset includes data points including 2000, . . . , 3000, 80,000, and 250,000 and the preconfigured cap value is set at 3500, then the dataset modified for the capped submodel 260 will include 3,500 and 3,500 in place of 80,000 and 250,000, respectively.

In block 530-O, the PMPM cost prediction engine 120 modifies datasets for the outlier submodel 270 based on a preconfigured cap value of cost and then trains the CRM 290 resulting from block 520 with the modified datasets. The preconfigured cap value of cost is set as a large enough value to separate outlier costs from the rest of costs in the datasets, the same value as used for the capped submodel 260. The PMPM cost prediction engine 120 can use the outlier submodel 270 for predicting a PMPM cost for the outlier submodel 270 subsequent to block 530-O. Then, the PMPM cost prediction engine 120 proceeds with block 540-O.

The PMPM cost prediction engine 120, in block 530-O, modifies datasets for training the outlier submodel 270 by changing costs for individual members in the datasets to zero (0), for each cost that is less than the preconfigured cap value. Accordingly, the datasets modified for training the outlier submodel 270 have only outlier costs greater than the preconfigured cap value, indicating the datasets would represent distribution of the outliers, which are known to cause the long-tail problem. For example, if an original dataset is the same as in the example for the capped submodel 260, which includes data points including 2000, . . . , 3000, 80,000, and 250,000 and the preconfigured cap value is set at 3,500, then the dataset modified for the outlier submodel 270 will include zeros (0) for values less than 3,500 (that is, 2000, . . . 3000) and leaves only outlier data points (that is, 80,000, and 250,000).

Due to the big data scale of the datasets, it is presumed that, depending on the preconfigured cap value, the number of datasets having the outlier costs would be substantial enough to influence the prediction of the cost for the entire population of the members. In the same embodiments for the health insurance service as above, the preconfigured cap value of cost used in blocks 530-C and 530-O can be set at, for example, average costs of the ninety five, ninety, or eighty percentile, that is, top ranks in terms of percentage, in the entire population of the members 109.

Figure 6:
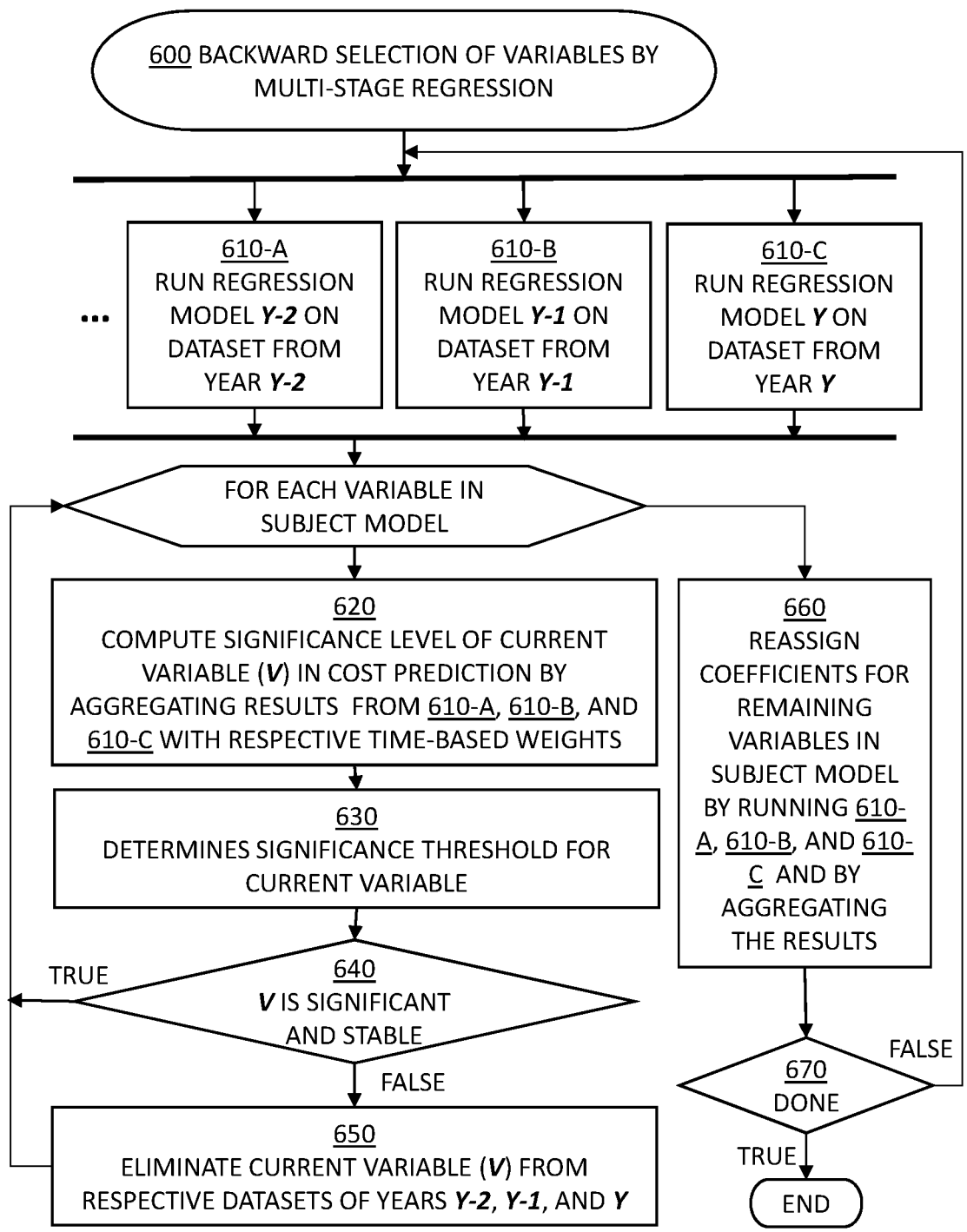
FIG. 6 depicts a flowchart for variable selection by multi-stage regression as performed by the Per Member Per Month cost prediction engine, in accordance with one or more embodiments set forth herein.

In block 540-C, the PMPM cost prediction engine 120 eliminates variables from the capped submodel 260 resulting from block 530-C based on the same selective standard and the multi-stage regression as in block 520, of which details are presented in FIG. 6 and corresponding description. Then, the PMPM cost prediction engine 120 proceeds with block 550-C.

In block 540-O, the PMPM cost prediction engine 120 eliminates variables from the outlier submodel 270 resulting from block 530-O based on the same selective standard and the multi-stage regression as in block 520, of which details are presented in FIG. 6 and corresponding description. Then, the PMPM cost prediction engine 120 proceeds with block 550-O.

The variable selection process from the capped submodel 260 and the outlier submodel 270, in blocks 540-C and 540-O, respectively, are the same as the variable selection process for the CRM 290 performed in block 520. In certain embodiments of the present invention, depending on operating configurations, the PMPM cost prediction engine 120 can perform only one of the variable selection, either the variable selection from the CRM 290 in block 520 or the variable selection from the capped submodel 260 and the outlier submodel 270 in blocks 540-C and 540-O, respectively. The variable selection from the CRM 290 in block 520 can improve efficiency of the PMPM cost prediction engine 120 because the variable selection in combination with multi-stage regression as presented in FIG. 6 and corresponding description is computationally expensive and time consuming. On the other hand, performing variable selections from the capped submodel 260 and the outlier submodel 270, in blocks 540-C and 540-O, respectively, leaves the respective submodels 260, 270 with more predictive variables specifically for the respective submodels 260, 270 that would improve accuracy of the PMPM cost predictions made by the respective submodels 260, 270. When the variable selections from the capped submodel 260 and the outlier submodel 270, in blocks 540-C and 540-O, respectively, are configured as optional in the operations of the PMPM cost prediction engine 120, the PMPM cost prediction engine 120 proceeds directly to block 550-C after block 530-C for the capped submodel 260, and directly to block 550-O after block 530-O for the outlier submodel 270.

In block 550-C, the PMPM cost prediction engine 120 produces a PMPM cost predicted by the capped submodel 260. The PMPM cost prediction engine 120 utilizes the PMPM cost predicted by the capped submodel 260, along with another PMPM cost predicted by the outlier submodel 270, to fit a distribution of the costs to actual cost using available datasets in block 560. Then, the PMPM cost prediction engine 120 proceeds with block 560.

In block 550-O, the PMPM cost prediction engine 120 produces a PMPM cost predicted by the outlier submodel 270. The PMPM cost prediction engine 120 utilizes the PMPM cost predicted by the outlier submodel 270, along with the previous PMPM cost predicted by the capped submodel 260, to fit a distribution of the costs to actual cost using available datasets in block 560. Then, the PMPM cost prediction engine 120 proceeds with block 560.

In block 560, the PMPM cost prediction engine 120 performs fitting of the CRM 290 by building a splice model that combines the PMPM cost predicted by the capped submodel 260 and the PMPM cost predicted by the outlier submodel 270, resulting from block 550-C and 560-O, respectively. Detailed operations of block 560 are presented in FIG. 7 and corresponding description. Then, the PMPM cost prediction engine 120 terminates modeling the CRM 290 and proceeds with block 340 of FIG. 3 to make prediction of the PMPM cost 160 by use of the CRM 290 as finalized.

FIG. 6 depicts a flowchart for variable selection by multi-stage regression as performed by the PMPM cost prediction engine, in accordance with one or more embodiments set forth herein.

Term "subject model" indicates a model that is going through the backward selection of variables by multi-stage regression 600, hereinafter the backward selection process, as shown in FIG. 6 and corresponding description as herein. The backward selection process 600 runs on any model for which datasets from a preconfigured number of years are available for training. In certain embodiments of the present invention, the backward selection process by multi-stage regression 600 is invoked from block 520, and/or block 540-C, and block 540-O of FIG. 5.

In conventional modeling, backward selection and regression analysis are distinctive techniques. The backward selection process 600 as presented herein is combined with a multiple number of regression modeling on per year datasets. In embodiments of the present invention, the PMPM cost prediction engine 120 performs regression analyses as shown in blocks 610-A, 610-B, and 610-C on the CRM 290 and/or the capped submodel 260 and the outlier submodel 270, but not on any component models of the early prediction models 250, for lack of multi-year training data as well as for training efficiency.

The PMPM cost prediction engine 120 processes blocks 610-A, 610-B, and 610-C in parallel. The PMPM cost prediction engine 120 proceeds with block 620 when all of blocks 610-A, 610-B, and 610-C are completed.

In block 610-A, the PMPM cost prediction engine 120 runs a regression model Y−2 on training dataset of year Y−2, indicating the claims record 219 data from two years back from a selected year Y. The PMPM cost prediction engine 120 subsequently cross validates the regression model Y−2 with a testing dataset that is distinctive from the training dataset of year Y−2.

In block 610-B, the PMPM cost prediction engine 120 runs another regression model Y−1 on training dataset of year Y−1, indicating the claims record 219 data from one year back from the selected year Y. The PMPM cost prediction engine 120 subsequently cross validates the regression model Y−1 with a testing dataset that is distinctive from the training dataset of year Y−1.

In block 610-C, the PMPM cost prediction engine 120 runs still another regression model Y on training dataset of year Y, indicating the claims record 219 data from the selected year Y. The PMPM cost prediction engine 120 subsequently cross validates the regression model Y with a testing dataset that is distinctive from the training dataset of year Y.

In blocks 610-A, 610-B, and 610-C, the PMPM cost prediction engine 120 observes how independent variables of the subject model influence a dependent variable by use of regression analysis for a plurality of yearly datasets, which is configured to be three (3) herein. It is meaningful to select yearly datasets from consecutive years such that a prediction of the PMPM cost 160 made based on a previous yearly dataset can be checked against the actual PMPM cost of the year for which the prediction had been made, in order to understand the overall model performance. Accordingly, the PMPM cost prediction engine 120 predetermines year Y based on availability of training datasets and test datasets for cross validation. The PMPM cost prediction engine 120 also determines the number of yearly datasets to use for the regression analysis, that is three (3) in the embodiments of FIG. 6, based on the presumption that overall model performance would improve as more number of yearly datasets are represented in the model, while the benefit to overall model performance for each additional yearly dataset would have a diminishing effect.

Regression analysis is a well-known form of predictive modeling technique in which causal relationships of predictors, also referred to as independent variables or input variables, to a response, also referred to as a dependent variable or an output variable, are investigated and quantified as respective coefficients of the predictors in calculating the response. Accordingly, the PMPM cost prediction engine 120 assigns coefficients respective to variables of the regression models Y−2, Y−1, and Y according to data patterns observed of the datasets from year Y−2, Y−1, and Y, respectively.

In the context of machine learning and data science, regression specifically refers to the estimation of a continuous dependent variable, denoted as y, from a list of input variables, denoted as x. Regression is essential for any machine learning problem that involves continuous numbers, the PMPM cost 160, and prediction of such numbers at a certain time in the future according to the pattern of relationships, referred to as a regression model, between the input variables and the dependent variable observed in regression analyses. In this specification, it is presumed that the respective regression models Y−2, Y−1, and Y are represented in a format in which the dependent variable is a function of independent variables, denoted often as $Y_i = f(X_i, \beta) + e_i$, where subscript i denotes a row of data, $\beta$ denotes a scalar or vector of unknown parameters, $X_i$ denotes a vector of the independent variables, $Y_i$ denotes a scalar of the dependent variable, and $e_i$ denotes a scalar of error terms that are not directly observed in datasets used in the modeling. The goal of regression modeling is to estimate the function $f(X_i, \beta)$ that most closely fits the datasets, and accordingly, the regression modeling operations by the PMPM cost prediction engine 120 in the embodiments of the present invention concerns coefficients in the function of variables in the subject model that determines the PMPM cost 160 to fit the training datasets resulting from the regression modeling of the subject model as noted above. Fitting of a model is commonly measured by a sum of squared residuals (SSR), also referred to as a residual sum of squares (RSS), in statistical terminology in the context of machine learning modeling, where residual indicates a difference between a predicted PMPM cost and an actual PMPM cost, by which a lower SSR indicates a better fitting of the model.

Upon completion of blocks 610-A, 610-B, and 610-C, the PMPM cost prediction engine 120 assigns the respective coefficients of the respective regression models Y−2, Y−1, and Y representing the subject model. The PMPM cost prediction engine 120 then proceeds with block 620 for variable selection.

The PMPM cost prediction engine 120 performs blocks 620 through 650 as a unit for each variable in the subject model.

In block 620, the PMPM cost prediction engine 120 computes a significance level of a current variable in predicting the PMPM cost 160 by aggregating respective coefficients of the respective regression models Y−2, Y−1, and Y representing the subject model with respective time-based weights, as resulting from blocks 610-A, 610-B, and 610-C, respectively. Then, the PMPM cost prediction engine 120 proceeds with block 630.

In certain embodiments of the present invention, the significance of a variable as combining the regression models Y−2, Y−1, and Y into a coefficient weighted with a time factor as below such that the more recent dataset has the greater influence. More specifically, the aggregated coefficient estimate of a current variable is computed as:

$$\text{Est} = |\Sigma_{i=y-2}^{y} \text{sign}(\text{est}_{y-i}) \times \alpha^{2 \times (y-i)} \times \text{est}_{y-i}^2|,$$

where $\text{est}_{y-i}$ indicates an estimate of year y−i, y indicates a selected year that is the latest, and subscript y−i is an age of the dataset. As shown by the component parameters of the aggregated coefficient estimate, the value of the aggregated coefficient estimate would be greater when the sign of an estimate of each year remains the same over the years subject to modeling and when the dataset is more recent for alpha ($\alpha$) that is valued between zero (0) and one (1). For example, if alpha is set at 0.05, which is conventional in statistical significance analysis, then $\alpha^{2 \times (y-i)}$ would be $\alpha^4$, that is, 0.00000625, for a two-year old dataset, $\alpha^2$, that is 0.0025, for a one-year old dataset, and $\alpha$, that is, 0.05, for a current dataset.

In the same embodiments as above, an aggregated standard error is computed as:

$$\text{StdErr} = \Sigma_{i=y-2}^{y} \alpha^{2 \times (y-i)} \times \text{stdErr}_{y-i}^2,$$

indicating a standard error of each year would have the greater influence in the aggregated standard error when the dataset is more recent for alpha ($\alpha$) that is valued between zero (0) and one (1).

The PMPM cost prediction engine 120 determines a significance level of the current variable as below:

$$LHS = \sqrt{(\text{Est}/\text{StdErr})},$$

where LHS is a symbol for the significance level for the current variable.

In block 630, the PMPM cost prediction engine 120 determines a significance threshold for the current variable. The significance threshold implements which aspects of the training datasets from years Y−2, Y−1, and Y would influence the selection of the variables. Then, the PMPM cost prediction engine 120 proceeds with block 640.

In the same embodiments of the present invention as in block 620, the significance threshold for the current variable is determined as:

$$RHS = \text{Penalty} \times \left| \frac{TP}{TotalNumSteps} \times step_j \right|,$$

where RHS is a symbol for the significance threshold for the current variable, Penalty indicates a stability penalty applied if respective signs of the current variable in the datasets are inconsistent, TP indicates a tuning parameter to reduce or to increase a likelihood that the current variable would remain in a next round of elimination, controlling the ultimate number of variables in the subject model to prevent overfitting of the outlier submodel 270, TotalNumSteps indicates a number of rounds of elimination the current variable had passed without being eliminated, and $step_j$ indicates an index for a current round of elimination.

In certain embodiments of the present invention, if the coefficients of the current variable from the latest two years have different signs, then Penalty is set to, for example, 1.41 or sqrt(2), and if the aforementioned signs are the same, then Penalty is set to 1, indicating that no penalty is applied for the current variable.

In certain embodiments of the present invention, TP can be set for the capped submodel 260 to 3, and TP can be set for the outlier submodel 270 to 8 when the backward selection process 600 is invoked from block 540-C, to favor a variable in the capped submodel 260 against a variable in the outlier submodel 270 when the backward selection process 600 is invoked from block 540-O. TP can be set to another value when the backward selection process 600 is invoked from block 520 for the CRM 290.

In block 640, the PMPM cost prediction engine 120 determines whether or not to eliminate the current variable by comparing the significance level of the current variable, denoted as LHS, to the significance threshold for the current variable, denoted as RHS. If the PMPM cost prediction engine 120 determines that the significance level of the current variable is greater than or equal to the significance threshold, that is, LHS≥RHS, then, the PMPM cost prediction engine 120 loops back to block 620 to process a next variable. If the PMPM cost prediction engine 120 determines that the significance level of the current variable is less than the significance threshold, that is LHS<RHS, then, the PMPM cost prediction engine 120 proceeds with block 650.

In block 650, the PMPM cost prediction engine 120 eliminates the current variable from respective training datasets of years Y−2, Y−1, and Y such that the current variable would not be used as a predictor in the regression models Y−2, Y−1, and Y in a next round of regression of blocks 610-A, 610-B, and 610-C, respectively. Then, the PMPM cost prediction engine 120 loops back to block 620 to check a next variable in the subject model.

As noted above, the PMPM cost prediction engine 120 performs blocks 620 through 650 as a unit for each variable in the subject model. The PMPM cost prediction engine 120 proceeds with block 660 after all variables in the subject model had been examined for elimination in blocks 620 through 650.

In block 660, the PMPM cost prediction engine 120 reassigns respective time-weighted coefficients to each of remaining variables in the subject model by running regression models Y−2, Y−1, and Y as shown in blocks 610-A, 610-B, and 610-C with and then aggregating respective coefficients from the regression models Y−2, Y−1, and Y. Then, the PMPM cost prediction engine 120 proceeds with block 670.

The time-weighted coefficients to each of remaining variables in the subject model are determined according to:

$$f = \frac{\sum_{i=y-2}^{y} \alpha^{y-i} \times f_{y-i}}{\sum_{i=y-2}^{y} \alpha^{y-i}},$$

which weighs respective coefficients for all remaining variables from the previous round of regression and variable selection across all regression models Y−2, Y−1, and Y.

The PMPM cost prediction engine 120 reassigns the coefficients of the remaining variables in the subject model such that the respectively reassigned coefficients in the subject model would: turn on a node corresponding to a variable in the subject model for remaining variables which had not been eliminated through the variable selection; turn off nodes corresponding to eliminated variables; or weigh nodes and/or edges corresponding to the remaining variables in the subject model accordingly.

In block 670, the PMPM cost prediction engine 120 determines whether or not to continue with another round of regression and variable selection, based on a preconfigured condition. If the PMPM cost prediction engine 120 determines that the subject model needs another round of regression and variable selection, then the PMPM cost prediction engine 120 proceeds with blocks 610-A, 610-B, and 610-C in parallel. If the PMPM cost prediction engine 120 determines that the subject model can be finalized, then the PMPM cost prediction engine 120 terminates processing and returns to the block that had invoked the backward selection by multi-stage regression 600, which can be block 520, and/or block 540-C, and block 540-O of FIG. 5.

In certain embodiments of the present invention, the preconfigured condition to continue another round of regression and variable selection is a threshold performance condition of the subject model. For example, the PMPM cost prediction engine 120 compares a prediction for year Y−1 made by the regression model Y−2 with the dataset of year Y−1 to determine the level of performance by the subject model, that is, how close the prediction of the cost from a previous year can match the actual cost data of a next year.

In certain embodiments of the present invention, the preconfigured condition to continue another round of regression and variable selection is that a number of remaining variables had reaches a certain target range, for example, one-third of the number of variables in an initial pool of the subject model.

FIG. 7 depicts a flowchart for fitting the CRM 290 by splicing predictions by submodels as performed by the PMPM cost prediction engine in block 560 of FIG. 5, in accordance with one or more embodiments set forth herein.

Prior to block 710, the PMPM cost prediction engine 120 predicted respective PMPM cost by the capped submodel 260 and the outlier submodel 270 in blocks 550-C and 550-O, respectively, subsequent to completing the respective modeling of the capped submodel 260 and the outlier submodel 270 in blocks 530-C and 540-C, and blocks 530-O and 530-O, respectively.

In block 710, the PMPM cost prediction engine 120 configures K number of splice points to interpolate the PMPM cost predicted by the capped submodel 260 and the PMPM cost predicted by the outlier submodel 270, resulting from blocks 550-C and 550-O, respectively. Then, the PMPM cost prediction engine 120 proceeds with blocks 720-1, 720-2, through 720-K in parallel to process for each splice point.

In certain embodiments of the present invention, the PMPM cost prediction engine 120 configures four (4) splice points between the PMPM cost predicted by the capped submodel 260, which is referred to as a minimum, or min, and the PMPM cost predicted by the outlier submodel 270, which is referred to as a maximum, or Max. It is well-known that with more interpolating points between two values, a curve of the interpolating points would be smoother, where a dependent variable has a non-linear relationships with independent variables. The PMPM cost prediction engine 120 determines the configured number of splice points at certain costs the CRM 290 is desired to match the actual cost within the range of costs between the min and the Max and/or to evenly divide the range of costs between the min and the Max. The splice points, predicted costs, are respective independent variables referred to as splice variables, and actual costs to be interpolated are dependent variables that will be determined as a function of splice variables in the splice model 280. For example, the four splice points, denoted as $SP_1, SP_2 \ldots SP_k$ are represented as respective distances normalized by the distance between the min and the Max, at 0.25, 0.5, 0.75, and 0.90. In this specification, term "splice point" is used to indicate a known datapoint of a splice variable.

In block 720-1, the PMPM cost prediction engine 120 calculates a first splice variable, that is, an independent variable, corresponding to a first splice point configured in block 710. In the same embodiment of the present invention as above where K=4, $SP_1 = \text{min} + (\text{Max} - \text{min}) \times 0.25$ In block 720-2, the PMPM cost prediction engine 120 calculates a second splice variable corresponding to a second splice point that is configured in block 710. In the same embodiment of the present invention as above where K=4, $SP_2 = \text{min} + (\text{Max} - \text{min}) \times 0.5$ In block 720-K, the PMPM cost prediction engine 120 calculates a K-th splice variable corresponding to a K-th splice point that is configured in block 710. In the same embodiment of the present invention as above where K=4, $SP_4 = \text{min} + (\text{Max} - \text{min}) \times 0.9$ The PMPM cost prediction engine 120 can perform blocks 720-1, 720-2, through 720-K in parallel as each splice variable can be independently processed. When all of blocks 720-1, 720-2, through 720-K are completed, the PMPM cost prediction engine 120 proceeds with block 730.

In block 730, the PMPM cost prediction engine 120 runs regression model on splice variables from blocks 720-1, 720-2, through 720-K to predict PMPM costs corresponding to the splice variables that interpolates the min and the Max, the PMPM cost predicted by the capped submodel 260 and the PMPM cost predicted by the outlier submodel 270, respectively. By performing regression analysis on the splice variables, the PMPM cost prediction engine 120 trains the splice model 280 that approximates a distribution of actual PMPM costs corresponding to respective splice variables between the min and the Max, which improves fitting of the CRM 290. Then, the PMPM cost prediction engine 120 proceeds with block 740.

In certain embodiments of the present invention, the splice model 280 is represented as a function of splice variables that determines the PMPM cost 160, that is, PMPM cost=$f(SV_1 \ldots SV_k, \beta)$, where $\beta$ indicates a vector of coefficients for each splice variable.

In block 740, the PMPM cost prediction engine 120 assigns coefficients on respective splice variables as resulting from the regression analysis in block 730 and produces the splice model 280. The splice variables in the splice model 280 are multiplied by respective coefficients, also referred to as coefficient scores, each of which indicates a level of correlation between each splice variable and the dependent variable, that is, the PMPM cost. In statistical analysis, the coefficient score commonly has a value in a range of zero to one (inclusive), denoted as [0 . . . 1], where a coefficient less than 0.5 indicates no or weak predictive correlation, and a coefficient greater than 0.7 indicates a strong correlation. As noted in description of FIG. 2, the PMPM cost prediction engine 120 produces the CRM 290 as a collection of the capped submodel 260, the outlier submodel 270, and the splice model 280. Then, the PMPM cost prediction engine 120 terminates fitting the CRM 290 and proceeds with block 340 of FIG. 3.

Certain embodiments of the present invention predict the PMPM cost of service by use of a prediction model ensemble of which component models are trained with certain corresponding datasets evolving throughout a tenure of a member such that the PMPM cost of service can be predicted for members with a tenure of any length. Certain embodiments of the present invention train components of the prediction model ensemble by machine learning tools and by big data processing tools. Certain embodiments of the present invention extract characteristics representative of individual members and forms cohorts of members having similar characteristics with respect to the PMPM cost of service in training the machine learning model ensemble and predicting the PMPM cost by use of the machine learning model ensemble. Certain embodiments of the present invention utilize variables trained for components of early prediction models of the prediction model ensemble in the CRM of the prediction model ensemble, which is utilized for predicting costs of members with longer tenures and sufficient datasets, such that overall training efficiency for the prediction model ensemble would be improved. Certain embodiments of the present invention utilize multi-stage regression in combination with backward selection of variables with time-weighted coefficients preferring recent datasets in optimizing component models of the prediction model ensemble such that variables having a certain threshold level of predictive significance consistently over time would remain in respective models. Certain embodiments of the present invention mitigate a skewed distribution of the PMPM cost prediction, as affected by a small number of outlier datapoints having extremely large cost, by training the capped submodel and the outlier submodel with respectively modified datasets based on a preconfigured cap value and by interpolating the predictions made by the capped submodel and by the outlier submodel with the splice model that redistributes the PMPM cost predictions by the submodels. Certain embodiments of the present invention may be implemented by use of a cloud platform/data center/server farm in various types including a Software-as-a-

Service (SaaS), Platform-as-a-Service (PaaS), Database-as-a-Service (DBaaS), and combinations thereof based on types of subscription. The skew-mitigated evolving prediction modeling and cost prediction service thereby can be offered for and delivered to any service providers/business entities/vendors of software applications in need from any location in the world.

Embodiments of the present invention present a computer implemented method including, for instance: forming, by one or more processors, a claims risk model for predicting a per member per month cost based on variables trained in early prediction models and variables of claim record data from data sources; generating, by the one or more processors, a first dataset for a capped submodel and a second dataset for an outlier submodel by modifying a training dataset for the claims risk model based on a preconfigured cap value; training, by the one or more processors, the claims risk model with the first dataset for the capped submodel, resulting in the capped submodel; training, by the one or more processors, the claims risk model with the second dataset for the outlier submodel, resulting in the outlier submodel; producing, by the one or more processors, a first cost predicted by the capped submodel and a second cost predicted by the outlier submodel; interpolating, by the one or more processors, the first cost predicted by the capped submodel and the second cost predicted by the outlier submodel from the producing by use of a splice model including a plurality of splice variables that fit datapoints in the training dataset at a predetermined number of splice points between the first cost and the second cost; and predicting, by the one or more processors, the per member per month cost for a member by running an individual dataset for the member on the capped submodel and the outlier submodel, and then running the splice model that redistributes the outcomes of the capped submodel and the outlier submodel.

Embodiments of the present invention present the computer implemented method also including, for instance: training, by the one or more processors, an enrollment model of the early prediction models for predicting the per member per month cost during a certain number of months for members having tenure less than the certain number of months in a first year based on variables of a member profile, a service specification, and external data, from respective data sources.

Embodiments of the present invention present the computer implemented method also including, for instance: training, by the one or more processors, an early claims model of the early prediction models for predicting the per member per month cost for a remainder of a first year of tenure for members having tenure less than a certain number of months in the first year based on variables of a member profile, a service specification, external data, and claim record data from respective data sources.

Embodiments of the present invention present the computer implemented method, the generating including, for instance: modifying, by the one or more processors, each of costs in any claim record data from the training dataset having a cost greater than the preconfigured cap value to the preconfigured cap value and storing in the first dataset for the capped submodel; and modifying, by the one or more processors, each of the costs in any claim record data from the training dataset having the cost less than or equal to the preconfigured cap value to zero (0) and storing in the second dataset for the outlier submodel.

Embodiments of the present invention present the computer implemented method also including, for instance: running, by the one or more processors, respective regression models on datasets for a predefined number of consecutive years, where each of the datasets include data for a full year, wherein the predefined number is three (3); pruning, by the one or more processors, a variable from the claims risk model based on a significance level of the variable in predicting the per member per month cost and based on stability of the sign of the variable over the predefined number of years, for all variables in the claims risk model; and reassigning, by the one or more processor, coefficients for remaining variables in the claims risk model by iterating the running and the pruning until the claims risk model meets a preconfigured condition to finalize the claims risk model.

Embodiments of the present invention present the computer implemented method also including, for instance: generating, by the one or more processors, a third dataset for the capped submodel and a fourth dataset for the outlier submodel by modifying the training dataset for the claims risk model based on another cap value distinctive from the preconfigured cap value; training, by the one or more processors, the claims risk model with the third dataset for the capped submodel, resulting in a secondary capped submodel; training, by the one or more processors, the claims risk model with the fourth dataset for the outlier submodel, resulting in a secondary outlier submodel; producing, by the one or more processors, a third cost predicted by the secondary capped submodel and a fourth cost predicted by the secondary outlier submodel; interpolating, by the one or more processors, the third cost predicted by the secondary capped submodel and the fourth cost predicted by the secondary outlier submodel from the producing by use of the splice model including the plurality of splice variables that fit the datapoints in the training dataset at the predetermined number of splice points between the third cost and the fourth cost; ascertaining, by the one or more processors, that the splice model fits better at the splice points between the third cost and the fourth cost than between the first cost and the second cost; and adjusting, by the one or more processor, the preconfigured cap value with the another cap value to thereby improve fitting of the claims risk model.

Embodiments of the present invention present the computer implemented method, for instance, in which each of coefficients for variables in the claims risk model is determined by aggregating regression modeling results from three (3) consecutive years based on a time-based weight heavily preferring recent data.

Figure 8:
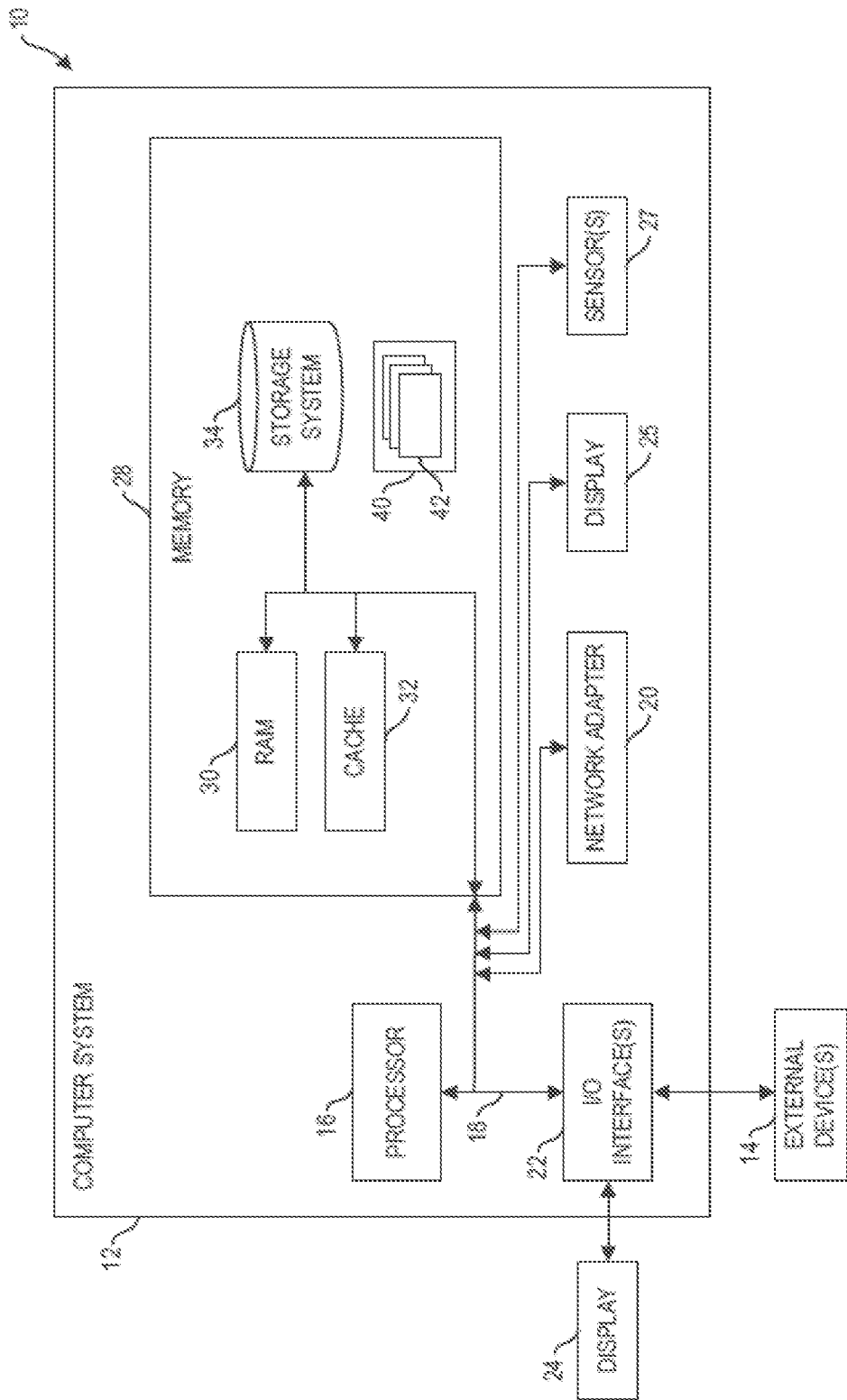
FIG. 8 depicts a cloud computing node according to an embodiment of the present invention.
Figure 9:
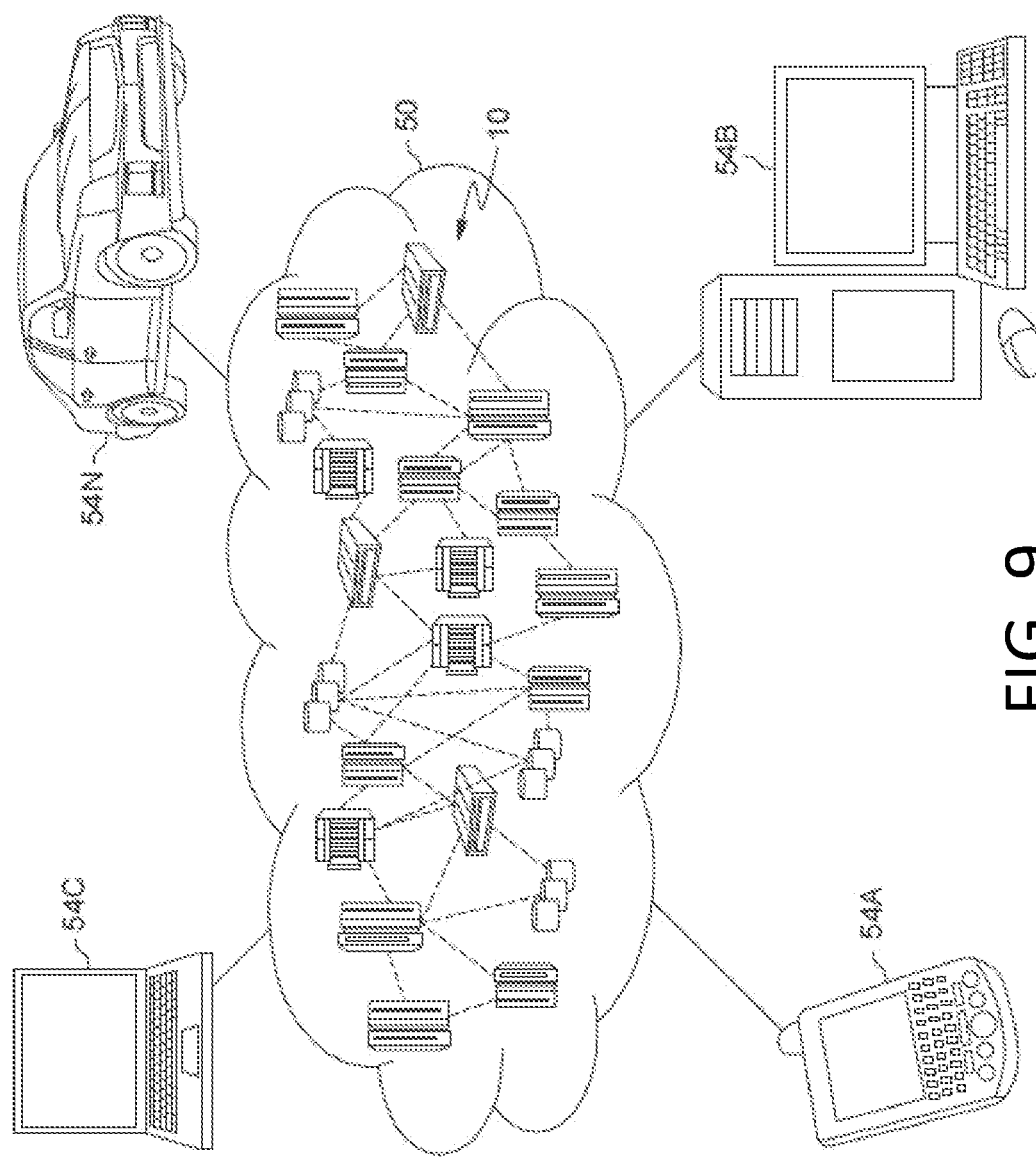
FIG. 9 depicts a cloud computing environment according to an embodiment of the present invention.
Figure 10:
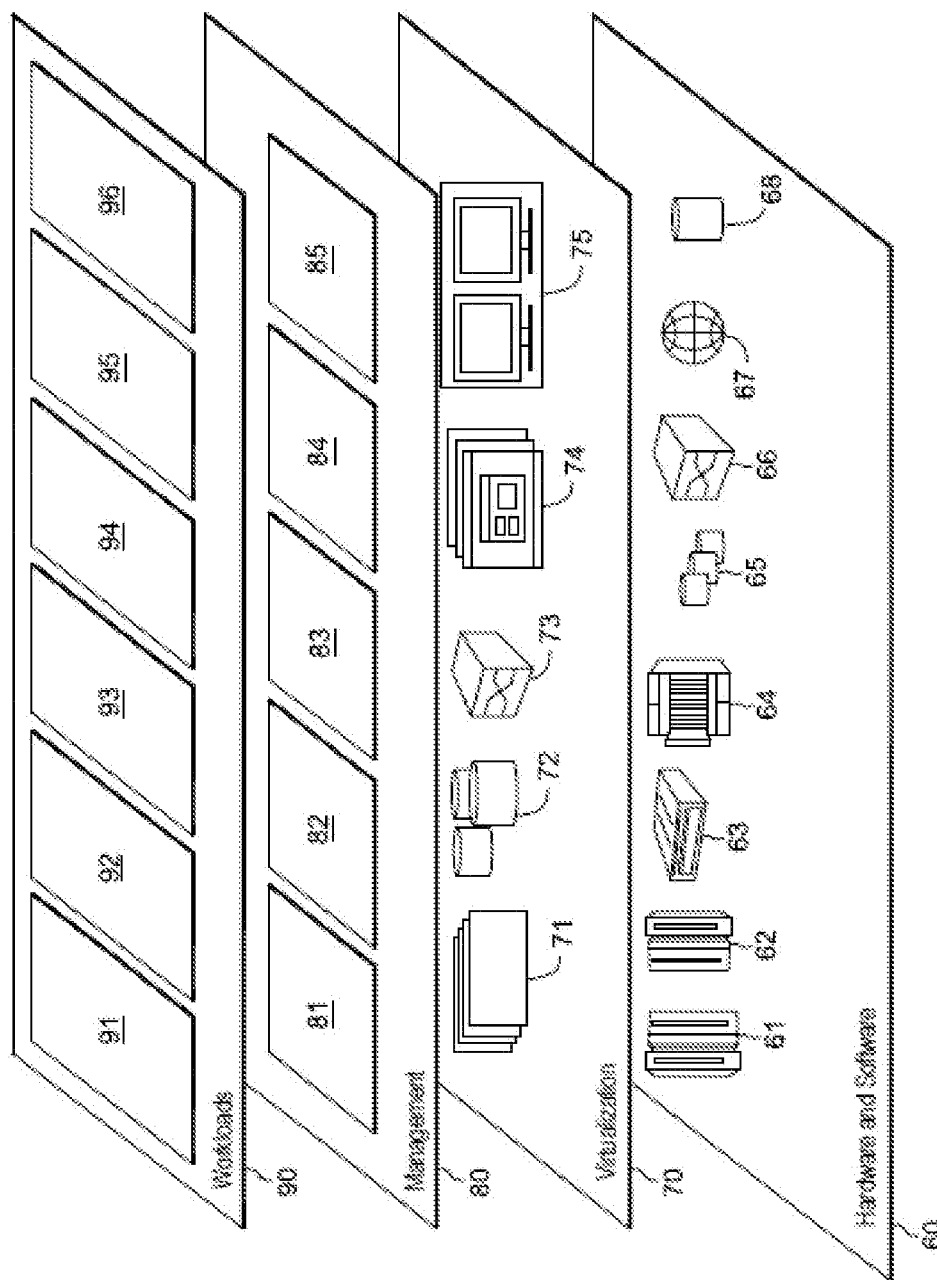
FIG. 10 depicts abstraction model layers according to an embodiment of the present invention.

FIGS. 8-10 depict various aspects of computing, including a cloud computing system, in accordance with one or more aspects set forth herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 8, a schematic of an example of a computer system/cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system-executable instructions, such as program processes, being executed by a computer system. Generally, program processes may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program processes may be located in both local and remote computer system storage media including memory storage devices.

As shown in FIG. 8, computer system 12 in cloud computing node 10 is shown in the form of a general-purpose computing device. The components of computer system 12 may include, but are not limited to, one or more processors 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile memory device (e.g., a "thumb drive", "external hard drive"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program processes that are configured to carry out the functions of embodiments of the invention.

One or more program 40, having a set (at least one) of program processes 42, may be stored in memory 28 by way of example, and not limitation, as well as an operating system, one or more application programs, other program processes, and program data. Each of the operating system, one or more application programs, other program processes, and program data or some combination thereof, may include an implementation of the PMPM cost prediction engine 120 and the automated subscription management system 110 of FIG. 1. Program processes 42, as in the PMPM cost prediction engine 120 generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18.

In addition to or in place of having external devices 14 and the display 24, which can be configured to provide user interface functionality, computing node 10 in one embodiment can include another display 25 connected to bus 18. In one embodiment, the display 25 can be configured as a touch screen render and can be configured to provide user interface functionality, e.g. can facilitate virtual keyboard functionality and input of total data. Computer system 12 in one embodiment can also include one or more sensor device 27 connected to bus 18. One or more sensor device 27 can alternatively or in addition be connected through I/O interface(s) 22. The one or more sensor device 27 can include a Global Positioning Sensor (GPS) device in one embodiment and can be configured to provide a location of computing node 10. In one embodiment, the one or more sensor device 27 can alternatively or in addition include, e.g., one or more of a camera, a gyroscope, a temperature sensor, a humidity sensor, a pulse sensor, a blood pressure (BP) sensor or an audio input device.

It should be understood that although not shown, other hardware and/or software components could be used in conjunction with computer system 12. Examples, include, but are not limited to: microcode, device drivers, redundant processors, external disk drive arrays, RAID systems, tape drives, and data archival storage systems, etc.

Referring now to FIG. 9, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Referring now to FIG. 10, a set of functional abstraction layers provided by cloud computing environment 50 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing components for the PMPM cost prediction engine and the automated subscription management system 96, as described herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

What is claimed is:

1. A computer implemented method comprising:
   forming, by one or more processors, a claims risk model for predicting a per member per month cost based on variables trained in early prediction models and variables of claim record data from data sources;
   generating, by the one or more processors, a first dataset for a capped submodel and a second dataset for an outlier submodel by modifying a training dataset for the claims risk model based on a preconfigured cap value;
   training, by the one or more processors, the claims risk model with the first dataset for the capped submodel, resulting in the capped submodel;
   training, by the one or more processors, the claims risk model with the second dataset for the outlier submodel, resulting in the outlier submodel;
   producing, by the one or more processors, a first cost predicted by the capped submodel and a second cost predicted by the outlier submodel;
   interpolating, by the one or more processors, the first cost predicted by the capped submodel and the second cost predicted by the outlier submodel from the producing by use of a splice model including a plurality of splice variables that fit datapoints in the training dataset at a predetermined number of splice points between the first cost and the second cost; and
   predicting, by the one or more processors, the per member per month cost for a member by running an individual dataset for the member on the capped submodel and the outlier submodel, and then running the splice model that redistributes the outcomes of the capped submodel and the outlier submodel.

2. The computer implemented method of claim 1, further comprising:
   training, by the one or more processors, an enrollment model of the early prediction models for predicting the per member per month cost during a certain number of months for members having tenure less than the certain number of months in a first year based on variables of a member profile, a service specification, and external data, from respective data sources.

3. The computer implemented method of claim 1, further comprising:
   training, by the one or more processors, an early claims model of the early prediction models for predicting the per member per month cost for a remainder of a first year of tenure for members having tenure less than a certain number of months in the first year based on variables of a member profile, a service specification, external data, and claim record data from respective data sources.

4. The computer implemented method of claim 1, the generating comprising:
   modifying, by the one or more processors, each of costs in any claim record data from the training dataset having a cost greater than the preconfigured cap value to the preconfigured cap value and storing in the first dataset for the capped submodel; and
   modifying, by the one or more processors, each of the costs in any claim record data from the training dataset having the cost less than or equal to the preconfigured cap value to zero (0) and storing in the second dataset for the outlier submodel.

5. The computer implemented method of claim 1, further comprising:
   running, by the one or more processors, respective regression models on datasets for a predefined number of consecutive years, where each of the datasets include data for a full year, wherein the predefined number is three (3);
   pruning, by the one or more processors, a variable from the claims risk model based on a significance level of the variable in predicting the per member per month cost and based on stability of the sign of the variable over the predefined number of years, for all variables in the claims risk model; and
   reassigning, by the one or more processors, coefficients for remaining variables in the claims risk model by iterating the running and the pruning until the claims risk model meets a preconfigured condition to finalize the claims risk model.

6. The computer implemented method of claim 1, further comprising:
   generating, by the one or more processors, a third dataset for the capped submodel and a fourth dataset for the outlier submodel by modifying the training dataset for the claims risk model based on another cap value distinctive from the preconfigured cap value;
   training, by the one or more processors, the claims risk model with the third dataset for the capped submodel, resulting in a secondary capped submodel;
   training, by the one or more processors, the claims risk model with the fourth dataset for the outlier submodel, resulting in a secondary outlier submodel;
   producing, by the one or more processors, a third cost predicted by the secondary capped submodel and a fourth cost predicted by the secondary outlier submodel;
   interpolating, by the one or more processors, the third cost predicted by the secondary capped submodel and the fourth cost predicted by the secondary outlier submodel from the producing by use of the splice model including the plurality of splice variables that fit the datapoints in the training dataset at the predetermined number of splice points between the third cost and the fourth cost;
   ascertaining, by the one or more processors, that the splice model fits better at the splice points between the third cost and the fourth cost than between the first cost and the second cost; and
   adjusting, by the one or more processors, the preconfigured cap value with the another cap value to thereby improve fitting of the claims risk model.

7. The computer implemented method of claim 1, wherein each of coefficients for variables in the claims risk model is determined by aggregating regression modeling results from three (3) consecutive years based on a time-based weight heavily preferring recent data.

8. A computer program product comprising:
   a computer readable storage medium readable by one or more processors and storing instructions for execution by the one or more processors for performing a method comprising:
      forming a claims risk model for predicting a per member per month cost based on variables trained in early prediction models and variables of claim record data from data sources;
      generating a first dataset for a capped submodel and a second dataset for an outlier submodel by modifying a training dataset for the claims risk model based on a preconfigured cap value;
      training the claims risk model with the first dataset for the capped submodel, resulting in the capped submodel;
      training the claims risk model with the second dataset for the outlier submodel, resulting in the outlier submodel;
      producing a first cost predicted by the capped submodel and a second cost predicted by the outlier submodel;
      interpolating the first cost predicted by the capped submodel and the second cost predicted by the outlier submodel from the producing by use of a splice model including a plurality of splice variables that fit datapoints in the training dataset at a predetermined number of splice points between the first cost and the second cost; and
      predicting the per member per month cost for a member by running an individual dataset for the member on the capped submodel and the outlier submodel, and then running the splice model that redistributes the outcomes of the capped submodel and the outlier submodel.

9. The computer program product of claim 8, further comprising:
   training an enrollment model of the early prediction models for predicting the per member per month cost during a certain number of months for members having tenure less than the certain number of months in a first year based on variables of a member profile, a service specification, and external data, from respective data sources.

10. The computer program product of claim 8, further comprising:
    training an early claims model of the early prediction models for predicting the per member per month cost for a remainder of a first year of tenure for members having tenure less than a certain number of months in the first year based on variables of a member profile, a service specification, external data, and claim record data from respective data sources.

11. The computer program product of claim 8, the generating comprising:
    modifying each of costs in any claim record data from the training dataset having a cost greater than the preconfigured cap value to the preconfigured cap value and storing in the first dataset for the capped submodel; and
    modifying each of the costs in any claim record data from the training dataset having the cost less than or equal to the preconfigured cap value to zero (0) and storing in the second dataset for the outlier submodel.

12. The computer program product of claim 8, further comprising:
    running respective regression models on datasets for a predefined number of consecutive years, where each of the datasets include data for a full year, wherein the predefined number is three (3);
    pruning a variable from the claims risk model based on a significance level of the variable in predicting the per member per month cost and based on stability of the sign of the variable over the predefined number of years, for all variables in the claims risk model; and
    reassigning, coefficients for remaining variables in the claims risk model by iterating the running and the pruning until the claims risk model meets a preconfigured condition to finalize the claims risk model.

13. The computer program product of claim 8, further comprising:
    generating a third dataset for the capped submodel and a fourth dataset for the outlier submodel by modifying the training dataset for the claims risk model based on another cap value distinctive from the preconfigured cap value;
    training the claims risk model with the third dataset for the capped submodel, resulting in a secondary capped submodel;
    training the claims risk model with the fourth dataset for the outlier submodel, resulting in a secondary outlier submodel;
    producing a third cost predicted by the secondary capped submodel and a fourth cost predicted by the secondary outlier submodel;
    interpolating the third cost predicted by the secondary capped submodel and the fourth cost predicted by the secondary outlier submodel from the producing by use of the splice model including the plurality of splice variables that fit the datapoints in the training dataset at the predetermined number of splice points between the third cost and the fourth cost;

ascertaining that the splice model fits better at the splice points between the third cost and the fourth cost than between the first cost and the second cost; and adjusting, by the one or more processor, the preconfigured cap value with the another cap value to thereby improve fitting of the claims risk model.

14. The computer program product of claim 8, wherein each of coefficients for variables in the claims risk model is determined by aggregating regression modeling results from three (3) consecutive years based on a time-based weight heavily preferring recent data.

15. A system comprising:
a memory;
one or more processors in communication with the memory; and
program instructions executable by the one or more processors via the memory to perform a method comprising:
  forming a claims risk model for predicting a per member per month cost based on variables trained in early prediction models and variables of claim record data from data sources;
  generating a first dataset for a capped submodel and a second dataset for an outlier submodel by modifying a training dataset for the claims risk model based on a preconfigured cap value;
  training the claims risk model with the first dataset for the capped submodel, resulting in the capped submodel;
  training the claims risk model with the second dataset for the outlier submodel, resulting in the outlier submodel;
  producing a first cost predicted by the capped submodel and a second cost predicted by the outlier submodel;
  interpolating the first cost predicted by the capped submodel and the second cost predicted by the outlier submodel from the producing by use of a splice model including a plurality of splice variables that fit datapoints in the training dataset at a predetermined number of splice points between the first cost and the second cost; and
  predicting the per member per month cost for a member by running an individual dataset for the member on the capped submodel and the outlier submodel, and then running the splice model that redistributes the outcomes of the capped submodel and the outlier submodel.

16. The system of claim 15, further comprising:
training an enrollment model of the early prediction models for predicting the per member per month cost during a certain number of months for members having tenure less than the certain number of months in a first year based on variables of a member profile, a service specification, and external data, from respective data sources.

17. The system of claim 15, further comprising:
training an early claims model of the early prediction models for predicting the per member per month cost for a remainder of a first year of tenure for members having tenure less than a certain number of months in the first year based on variables of a member profile, a service specification, external data, and claim record data from respective data sources.

18. The system of claim 15, the generating comprising:
modifying each of costs in any claim record data from the training dataset having a cost greater than the preconfigured cap value to the preconfigured cap value and storing in the first dataset for the capped submodel; and
modifying each of the costs in any claim record data from the training dataset having the cost less than or equal to the preconfigured cap value to zero (0) and storing in the second dataset for the outlier submodel.

19. The system of claim 15, further comprising:
running respective regression models on datasets for a predefined number of consecutive years, where each of the datasets include data for a full year, wherein the predefined number is three (3);
pruning a variable from the claims risk model based on a significance level of the variable in predicting the per member per month cost and based on stability of the sign of the variable over the predefined number of years, for all variables in the claims risk model; and
reassigning, coefficients for remaining variables in the claims risk model by iterating the running and the pruning until the claims risk model meets a preconfigured condition to finalize the claims risk model, wherein each of coefficients for the remaining variables in the claims risk model is determined by aggregating regression modeling results from the three consecutive years based on a time-based weight heavily preferring recent data.

20. The system of claim 15, further comprising:
generating a third dataset for the capped submodel and a fourth dataset for the outlier submodel by modifying the training dataset for the claims risk model based on another cap value distinctive from the preconfigured cap value;
training the claims risk model with the third dataset for the capped submodel, resulting in a secondary capped submodel;
training the claims risk model with the fourth dataset for the outlier submodel, resulting in a secondary outlier submodel;
producing a third cost predicted by the secondary capped submodel and a fourth cost predicted by the secondary outlier submodel;
interpolating the third cost predicted by the secondary capped submodel and the fourth cost predicted by the secondary outlier submodel from the producing by use of the splice model including the plurality of splice variables that fit the datapoints in the training dataset at the predetermined number of splice points between the third cost and the fourth cost;
ascertaining that the splice model fits better at the splice points between the third cost and the fourth cost than between the first cost and the second cost; and
adjusting, the preconfigured cap value with the another cap value to thereby improve fitting of the claims risk model.

* * * * *